(12) United States Patent
Eaton

(10) Patent No.: US 12,374,362 B1
(45) Date of Patent: Jul. 29, 2025

(54) HARMONIC SENSOR PHASE ERROR DETECTION FOR DATA STORAGE DEVICES

(71) Applicant: Western Digital Technologies, Inc., San Jose, CA (US)

(72) Inventor: Robert Eaton, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/889,827

(22) Filed: Sep. 19, 2024

(51) Int. Cl.
| | | |
|---|---|---|
| G11B 7/1263 | (2012.01) | |
| G11B 5/00 | (2006.01) | |
| G11B 5/012 | (2006.01) | |
| G11B 5/596 | (2006.01) | |
| G11B 20/10 | (2006.01) | |

(52) U.S. Cl.
CPC ............ *G11B 7/1263* (2013.01); *G11B 5/012* (2013.01); *G11B 5/59611* (2013.01); *G11B 5/59655* (2013.01); *G11B 20/10398* (2013.01); *G11B 2005/0021* (2013.01)

(58) Field of Classification Search
CPC ... G11B 7/1263; G11B 5/012; G11B 5/59611; G11B 5/59655; G11B 20/10398; G11B 2005/0021
See application file for complete search history.

(56) References Cited

U.S. PATENT DOCUMENTS

| | | | |
|---|---|---|---|
| 5,784,296 A | 7/1998 | Baker | |
| 7,271,753 B1 | 9/2007 | Padukone | |
| 7,298,574 B1 * | 11/2007 | Melkote | G11B 5/59616 360/78.04 |
| 8,654,466 B1 * | 2/2014 | McFadyen | G11B 5/607 360/75 |
| 9,595,288 B1 | 3/2017 | Chu | |
| 10,366,722 B1 * | 7/2019 | Mendonsa | G11B 5/012 |
| 10,408,674 B2 | 9/2019 | Kiely | |
| 10,657,987 B1 | 5/2020 | Chu | |
| 10,770,106 B1 | 9/2020 | Mader | |
| 11,450,346 B2 | 9/2022 | Tatah | |

OTHER PUBLICATIONS

Li, et al., "HAMR Noise Mechanism Study with Spin Stand Testing", IEEE Transactions on Magnetics, (2015).
Sakoguchi, et al., "Mode Hopping Impact on NFT Protrusion Measurement in HAMR," in IEEE Transactions on Magnetics, vol. 59, No. 11, pp. 1-4, (2023).

* cited by examiner

*Primary Examiner* — Andrew Sasinowski
(74) *Attorney, Agent, or Firm* — Patent Law Works LLP

(57) ABSTRACT

Example systems, data storage devices, and methods for using a harmonic sensor in the read channel of a data storage device to determine phase error are described. The data storage device includes a storage medium with data tracks and a head that can be positioned for reading and writing those tracks. A tone pattern may be written to a data track and a read signal from the tone pattern may subsequently be processed through the harmonic sensor to acquire amplitude data corresponding differences between a target frequency of the tone pattern and a read frequency from the read signal. The amplitude data may be processed to determine phase error values that correspond to an operating condition during writing, such as mode hops and/or down track thermal gradients related to operation of a laser during heat assisted magnetic recording.

20 Claims, 11 Drawing Sheets

HARMONIC SENSOR PHASE ERROR DETECTION FOR DATA STORAGE DEVICES

TECHNICAL FIELD

The present disclosure relates to phase detection in data storage devices. In particular, the present disclosure relates to using improved phase detection using a harmonic sensor to determine localized heating phenomena, such as mode hops and down track thermal gradients, in data storage devices using heat assisted magnetic recording (HAMR).

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Data is typically written to the disk by modulating a write current in an inductive coil of a write element to record magnetic transitions onto the disk surface in a process referred to as saturation recording. During readback, the magnetic transitions are sensed by a read element (e.g., a magnetoresistive element) and the resulting read signal is demodulated by a suitable read channel. Heat assisted magnetic recording (HAMR) is a more recent development that improves the quality of written data by heating the disk surface with a laser during write operations in order to decrease the coercivity of the magnetic medium, thereby enabling the magnetic field generated by the write coil to more readily magnetize the disk surface.

Laser mode hops modulate the output power of the laser, changing the size of the thermal spot generated by the near-field transducer (NFT). This change in size introduces a systemic phase shift in the positions of data bits written to the storage medium. Similarly, HAMR write operations generate a thermal gradient in the down track direction based on the performance of the laser and the thermal properties of the head-disk interface. The down track thermal gradient may also be measured as a phase shift in the position of data bits written at different laser power settings. Both laser mode hops and down track thermal gradients may have a significant impact on the qualification, margining, and performance of data storage devices and their components. Further, mode hops and thermal gradients may change over the operating life of a data storage device, which may impact the ongoing performance and reliability of those data storage devices, as well as potentially indicating degradation of one or more components.

Existing approaches to measuring phase error from read signals may be based on receiving raw read data samples from the read channel analog-to-digital converter (ADC) and post-processing them in software for spectral analysis. This post-processing may require an undesirable amount of time, processing power, and memory. For example, during production and qualification, such measurements may be offloaded from the data storage device to the processor and memory of a separate test system.

More efficient phase error measurement may enable better measurement and management of operating conditions in data storage devices, particularly regarding the qualification, performance, and degradation of HAMR components based on changing mode hops and thermal gradients. There is a need for technology that provides improved phase error measurement in data storage devices.

SUMMARY

Various aspects for harmonic sensor phase error detection in data storage devices are disclosed, particularly the use of a hardware harmonic sensor in the read channel to simplify the computational requirements for spectral analysis to detect thermal write operating conditions, such as laser mode hops and down track thermal gradients.

One general aspect includes a data storage device that includes: a non-volatile storage medium; a head actuated over the non-volatile storage medium; and control circuitry configured to: write, using the head, a tone pattern to at least one track on the non-volatile storage medium; acquire, using a harmonic sensor in a read channel configured to receive a read signal from the head, amplitude data from the tone pattern and corresponding to differences between a target frequency of the tone pattern and a read frequency from the read signal; determine, based on the amplitude data, a plurality of phase error values; and determine, based on the plurality of phase error values, an operating condition during the write.

Implementations may include one or more of the following features, alone or in any combination. The head may include a laser configured to heat the non-volatile storage medium while writing data to the non-volatile storage medium; and the operating condition corresponds to an operating characteristic of the laser. The operating condition may include at least one mode hop of the laser; the control circuitry may be further configured to: configure an acquisition window of the harmonic sensor corresponding to a sector portion of the at least one track; and configure a set of acquisition frequencies of the harmonic sensor corresponding to a plurality of data points proximate the target frequency of the tone pattern; and determining the operating condition may include detecting the at least one mode hop based on a comparison of amplitude data values at the set of acquisition frequencies to determine the plurality of phase error values. Detecting the at least one mode hop may include: determining, using the set of acquisition frequencies, at least three data points for a target peak; determining a relationship among the at least three data points to determine a phase error value; and comparing the phase error value to a mode hop threshold to determine that the at least one mode hop has been detected. Determining the operating condition further may include calculating an average frequency error to quantify a size of the at least one mode hop. The non-volatile storage medium may include a rotating disk; the at least one track may include a plurality of sector portions along a length of the at least one track; and acquiring the amplitude data may include sampling frequency error for the set of acquisition frequencies at the plurality of sector portions for at least one revolution of the rotating disk. The control circuitry may be further configured to, during field operation of the data storage device: band erase, prior to writing the tone pattern, the at least one track; adjust, responsive to detecting the at least one mode hop and based on at least one parameter corresponding to the at least one mode hop, at least one operating parameter selected from: a first laser current parameter selected to reduce mode hops; a second laser current parameter selected to compensate for changing write widths based on a size of the at least one mode hop; an adjacent track interference weighting parameter based on the size of the at least one mode hop; and a risk parameter correlating the size of the at least one mode hop to degradation of the head; and write, to the non-volatile storage medium, user data using the adjusted at least one operating parameter. The operating condition may include a down track thermal gradient value correlating changes in laser power to changes in position of written data; the control circuitry may be further configured to: configure an acquisition window of the harmonic sensor corresponding to a sector portion of the at least one track; determine a range of laser current values used during writing the tone pattern in the sector portion; and configure a set of acquisition frequencies of the harmonic sensor corresponding to positions of changes in laser current value across the range of laser current values: and determining the operating condition may include using the plurality of phase error values to calculate phase shift relative to the changes in laser power to determine corresponding set of down track thermal gradient values. The control circuitry may be further configured to: determine a baseline set of down track thermal gradient values; compare, during field operation of the data storage device, the corresponding set of down track thermal gradient values to the baseline set of down track thermal gradient values to generate at least one thermal gradient change value; adjust, responsive to the at least one thermal gradient change value meeting a change threshold, at least one operating parameter selected from: a laser current parameter selected to adjust down track thermal gradient based on the at least one thermal gradient change value; an adjacent track interference weighting parameter based on a correlation between down track thermal gradient values and a write width parameter; a risk parameter correlating the at least one thermal gradient change to degradation of the head; a smear removal threshold for initiating a smear removal operation based on low down track thermal gradient values; and a thermal fly height control parameter to adjust head-media spacing based on the at least one thermal gradient change; and write, to the non-volatile storage medium, user data using the adjusted at least one operating parameter. The control circuitry may be further configured to set, prior to field operation of the data storage device and based on the plurality of phase error values, at least one parameter selected from: a squeeze margin parameter for determining track format based on at least one mode hop measurement; a squeeze margin parameter for determining track format based on at least one down track thermal gradient measurement; a head failure parameter based on at least one mode hop measurement meeting at least one failure threshold; a head failure parameter based on at least one down track thermal gradient measurement meeting at least one failure threshold; a laser current parameter based on mode hop measurements to reduce mode hops during write operations; a write current parameter based on mode hop measurements to reduce mode hops during write operations; a write quality parameter based on mode hop measurements to qualify data sectors; and a risk parameter based on changes in at least one down track thermal gradient measurement over a test time.

Another general aspect includes a method that includes: writing, using a head actuated over a non-volatile storage medium of a data storage device, a tone pattern to at least one track on the non-volatile storage medium; acquiring, using a harmonic sensor in a read channel configured to receive a read signal from the head, amplitude data from the tone pattern and corresponding to differences between a target frequency of the tone pattern and a read frequency from the read signal; determining, based on the amplitude data, a plurality of phase error values; and determining, based on the plurality of phase error values, an operating condition during the writing.

Implementations may include one or more of the following features. The method may include heating, using a laser in the head, the non-volatile storage medium while writing data to the non-volatile storage medium, where the operating condition corresponds to an operating characteristic of the laser. The method may include: configuring an acquisition window of the harmonic sensor corresponding to a sector portion of the at least one track; configuring a set of acquisition frequencies of the harmonic sensor corresponding to a plurality of data points proximate the target frequency of the tone pattern; and detecting, based on a comparison of amplitude data values at the set of acquisition frequencies to determine the plurality of phase error values, at least one mode hop of the laser, where the operating condition may include the at least one mode hop of the laser. Detecting the at least one mode hop may include: determining, using the set of acquisition frequencies, at least three data points for a target peak; determining a relationship among the at least three data points to determine a phase error value; and comparing the phase error value to a mode hop threshold to determine that the at least one mode hop has been detected. Determining the operating condition further may include calculating an average frequency error to quantify a size of the at least one mode hop. The non-volatile storage medium may include a rotating disk; the at least one track may include a plurality of sector portions along a length of the at least one track; and acquiring the amplitude data may include sampling frequency error for the set of acquisition frequencies at the plurality of sector portions for at least one revolution of the rotating disk. The method may include, during field operation of the data storage device: band erasing, prior to writing the tone pattern, the at least one track; adjusting, responsive to detecting the at least one mode hop and based on at least one parameter corresponding to the at least one mode hop, at least one operating parameter selected from: a first laser current parameter selected to reduce mode hops; a second laser current parameter selected to compensate for changing write widths based on a size of the at least one mode hop; an adjacent track interference weighting parameter based on the size of the at least one mode hop; and a risk parameter correlating the size of the at least one mode hop to degradation of the head; and writing, to the non-volatile storage medium, user data using the adjusted at least one operating parameter. The method may include: configuring an acquisition window of the harmonic sensor corresponding to a sector portion of the at least one track; determining a range of laser current values used during writing the tone pattern in the sector portion; configuring a set of acquisition frequencies of the harmonic sensor corresponding to positions of changes in laser current value across the range of laser current values; and determining, using the plurality of phase error values to calculate phase shift relative to the changes in laser power, a corresponding set of down track thermal gradient values, where the operating condition may include the set of down track thermal gradient values correlating changes in laser power to changes in width and position of written data. The method may include: determining a baseline set of down track thermal gradient values; comparing, during field operation of the data storage device, the corresponding set of down track thermal gradient values to the baseline set of down track thermal gradient values to generate at least one thermal gradient change value; adjusting, responsive to the at least one thermal gradient change value meeting a change threshold, at least one operating parameter selected from: a laser current parameter selected to adjust down track thermal gradient based on the at least one thermal gradient change value; an adjacent track interference weighting parameter based on a correlation between down track thermal gradient values and a write width parameter; a risk parameter correlating the at least one thermal gradient change to degradation of the head; a smear removal threshold for initiating a smear removal operation based on low down track thermal gradient values; and a thermal fly height control parameter to adjust head-media spacing based on the at least one thermal gradient change; and writing, to the non-volatile storage medium, user data using the adjusted at least one operating parameter.

Still another general aspect includes a data storage device that includes: a non-volatile storage medium that includes a plurality of data tracks; a head actuated over the non-volatile storage medium, where the head may include a laser configured to heat the non-volatile storage medium while writing data to the non-volatile storage medium; means for writing, using the head, a tone pattern to at least one track on the non-volatile storage medium; means for acquiring, using a harmonic sensor in a read channel configured to receive a read signal from the head, amplitude data from the tone pattern and corresponding to differences between a target frequency of the tone pattern and a read frequency from the read signal; means for determining, based on the amplitude data, a plurality of phase error values; and means for determining, based on the plurality of phase error values, an operating condition of the laser during the writing.

The present disclosure describes various aspects of innovative technology capable of improving phase error detection from the read signal in data storage devices. The various embodiments include operations and control circuitry to overcome or at least reduce issues previously encountered in data storage devices, particularly data storage devices using HAMR technology, and, accordingly, are more reliable and/or efficient than other data storage devices. That is, the various embodiments disclosed herein include hardware and/or software with functionality to improve efficient detection of phase errors in read signals and their correlation to thermal write operating conditions, such as by using a harmonic sensor in the read channel to perform sample processing and simplify the conversion of frequency measurements to phase error for detecting correlated operating conditions. Accordingly, the embodiments disclosed herein provide various improvements to HAMR data storage devices and computing systems incorporating such data storage devices.

BRIEF DESCRIPTION OF THE DRAWINGS

The techniques introduced herein are illustrated by way of example, and not by way of limitation, in the figures of the accompanying drawings in which like reference numerals are used to refer to similar elements.

DETAILED DESCRIPTION

Figure 1A:
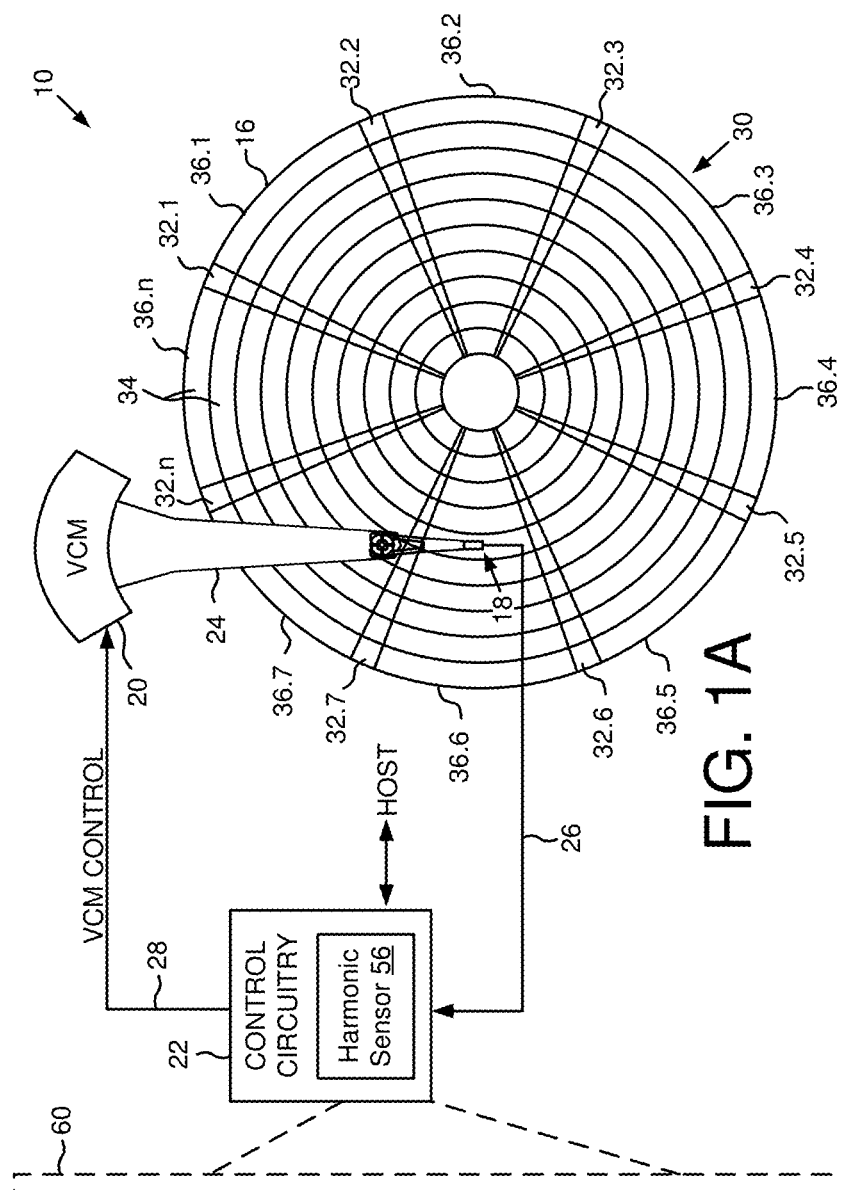
FIG. 1A is a diagram of an example data storage device in the form of a disk drive comprising a head actuated over a disk surface.

The present disclosure relates to the field of data storage devices, and more specifically to the detection of phase errors in read signals in heat-assisted magnetic recording (HAMR) data storage devices. In some embodiments, the disclosed technology utilizes a harmonic sensor in a read channel to detect these phase errors. The harmonic sensor may be configured to acquire amplitude data from a tone pattern written on a non-volatile storage medium by a head actuated over the medium. A tone pattern may be defined as any repeating pattern written to the storage medium that can generate discrete spectral peaks at predictable frequencies. Some common examples may be repeating sets of magnetic bits or domains having a particular length, such as 2T, 3T, 4T, etc. patterns. One or more harmonics of a pseudorandom binary sequence (PRBS) written to the storage medium may produce a similarly usable tone signal. The harmonic sensor may be embodied in a hardware circuit in the read channel of the data storage device to efficiently accumulate spectral data from the read signal in a set of registers. The amplitude data corresponds to differences between a target frequency of the tone pattern and a read frequency from the read signal.

In some configurations, the head may include a laser configured to heat the non-volatile storage medium while writing data to it. The operating condition of the laser, such as mode hops or down track thermal gradients, can be determined based on the phase error values derived from the amplitude data. Mode hops, which modulate the output power of the laser, can change the size of the thermal spot generated by the near-field transducer (NFT), introducing a systemic shift in the positions of data bits written to the storage medium. Down track thermal gradient may similarly trigger shifts in the positions of data bits written depending on the laser current employed. Phase error in the read back of a tone pattern written under these operating conditions may be used to detect and measure these operating conditions.

In some configurations, the harmonic sensor may be configured with an acquisition window corresponding to a sector portion of a data track on the non-volatile storage medium, where the tone pattern is written. The acquisition window may be configured for multiple acquisitions (with varying acquisition lengths) in the same sector or acquisitions across sectors of the same track. The harmonic sensor may also be configured with a set of acquisition frequencies corresponding to the target frequency of the tone pattern, a lower skirt frequency, and an upper skirt frequency. The harmonic sensor may sample and accumulate amplitude values for the frequency errors at signal positions corresponding to the three acquisition frequencies to provide a desired resolution for the phase error calculations. The comparison of the two skirt frequencies, divided by the tone frequency, may be used to generate phase error values for the tone pattern from the amplitude values in the register of the harmonic sensor. The operating condition of the laser, such as mode hops or down track thermal gradient, can be detected based on analysis of the phase error values across multiple acquisition windows or multiple sectors. The additional data processing nay be executed by data storage device firmware or a dedicated circuit with little additional processing overhead relative to the harmonic sensor itself.

In some configurations, the disclosed technology may be used to calculate an average frequency error to quantify the size of the mode hops. This can provide valuable information about the operating condition of the laser during the writing process. The technology may also be used to adjust various operating parameters in response to detected mode hops, which can help to improve the performance and reliability of the data storage device.

In some configurations, the disclosed technology may be used to determine down track thermal gradient values, which correlate changes in laser power to changes in the position of written data. This can provide valuable insights into the operating condition of the laser and the thermal properties of the head-disk interface. The technology may also be used to adjust various operating parameters in response to changes in down track thermal gradients, which can help to optimize the performance and reliability of the data storage device.

In summary, the present disclosure provides a technology for detecting phase errors in read signals and correlating them to thermal write operating conditions in HAMR data storage devices. This technology can provide valuable insights into the operating condition of the laser and the thermal properties of the head-disk interface, and can be used to optimize the performance and reliability of the data storage device, during manufacturing and test of data storage devices or during their field operation.

Figure 1B:
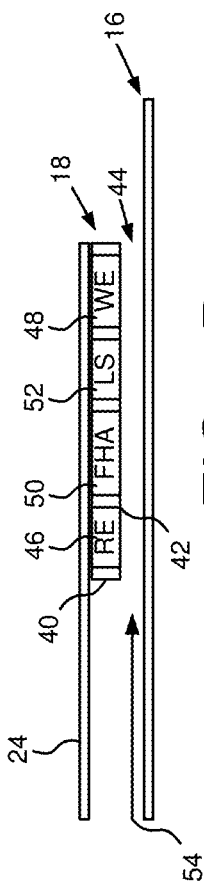
FIG. 1B is a diagram of an example HAMR head actuated over the disk surface.

FIGS. 1A and 1B show a data storage device 100 in the form of a disk drive according to an embodiment comprising at least one disk surface 16 as a non-volatile storage medium. Disk surface 16 comprises a plurality of data tracks 34 defined by servo sectors 32.1-32.n and data sectors 36.1-36.n according to a disk format 30, where each data track comprises a plurality of data sector portions corresponding to each data sector 36.1-36.n for a revolution of the disk. At least one head 18 is actuated over the rotating disk surface 16 by an actuator 20 for reading data from and writing data to disk surface 16. In some configurations, actuator 20 may include a voice coil motor (VCM) and actuator arm 24, including one or more actuator stages. For example, an actuator may include a VCM stage for gross positioning and one or more additional motor controls for fine positioning of the heads at different scales, such as a milli-controller stage, a micro-controller stage, etc.

In the configuration shown in FIG. 1B, head 18 is comprised of a slider body 40 and has an air bearing surface 42 parallel to disk surface 16 and separated by an air gap at head-media interface 44. Head 18 may be supported over the disk by actuator arm 24 and attached by a gimbal assembly. The distance from disk surface 16 to air bearing surface 42 may correspond to the fly height of head 18, subject to protrusions by one or more head elements from air bearing surface 42, which may reduce the effective fly height of head 18. In the configuration shown, head 18 includes a read element 46 and write element 48 configured for reading from and writing to disk surface 16.

In some configurations, head 18 also includes a fly height actuator 50 configured for fine adjustment of the fly height, for example, on a nanometer scale. Fly height actuator 50 may be operable to adjust the fly height of head 18 over disk surface 16 based on a control signal from control circuitry 22. Fly height actuator 50 may include any suitable powered actuator, such as a heater which controls the fly height through thermal expansion or a piezoelectric (PZT) actuator which may deflect toward the disk when energized by a driving voltage. Fly height actuator 50 may be controlled to maintain head 18 at a target fly height during read and write operations. When not performing read/write operations, fly height actuator 50 may be controlled to increase the fly height of the head so as to avoid or reduce collisions with asperities on the disk.

In some configurations, head 18 may include a laser 52 operable to heat disk surface 16 during write operations. For example, laser 52 may be a near-field transducer (NFT) configured to heat disk surface 16 ahead of write element 48 to lower the coercivity of the magnetic material in the storage medium as the write field is applied. Arrow 54 shows the direction of rotation of the disk relative to head 18. Laser 52 may be any suitable laser for heating disk surface 16, such as a laser diode, and may include additional features to assist in focusing the laser on the desired heating location on disk surface 16, such as waveguides, focusing lenses, or similar elements. Laser 52 may be controlled by control circuitry 22.

Figure 1C:
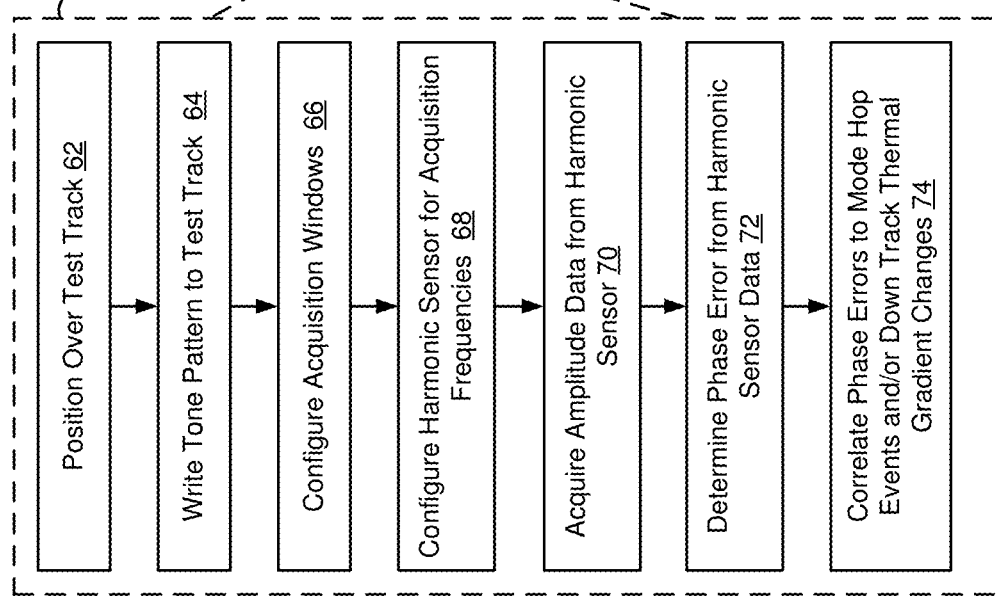
FIG. 1C is a flow diagram of an example method for phase error detection that may be implemented in the control circuitry of FIG. 1A for the HAMR head configuration of FIG. 1B.

Data storage device 100 further comprises control circuitry 22 configured to execute the flow diagram of FIG. 1C for using harmonic sensor 56 to detect operating conditions, such as laser mode hops and down track thermal gradients, related to the operations of laser 52. The effects of mode hops and thermal gradient changes on the write operations may be determined from sampling and processing spectral data from a read back signal from a tone pattern written to disk surface 16. The frequency data accumulated by harmonic sensor 56 may provide an effective shortcut for determining the phase errors indicative of changes in write operating conditions. A step in phase is mathematically equivalent to a narrow pulse in frequency. As a result, the harmonic sensor can be used to detect this frequency pulse. To use the harmonic sensor as a phase detector, three frequencies may be be measured, a carrier frequency (a harmonics of the signal written on the disk) and two closely spaced frequencies on either side of the carrier nominally at half the carrier half-amplitude, referred to herein as skirt frequencies. The phase jump is detected as changes in (lower_skirt_amplitude-upper_skirt_amplitude)/carrier_amplitude). The amplitude of the skirt frequencies become unbalanced when the instantaneous carrier frequency changes. This leads to a detectable differential signal. The harmonic sensor may be configured to sample and aggregate amplitude data at the three frequencies from the read signal of the tone pattern to enable further processing of those amplitude values to generate corresponding phase error values and correlated those phase error values to the operating conditions of interest.

In some configurations, control circuitry 22 may include on-board electronics comprising one or more systems on a chip (SOC), application-specific integrated circuits (ASICs), and/or other data or signal processing components attached to a printed circuit board assembly (PCBA) and/or other interconnects (such as the flex connector to the actuators). Control circuitry 22 may include circuits, processors, memory devices, and software or firmware executed therein for completing various data and signal processing tasks, including control of actuator 20, read-write operations through head 18, and rotation of disk surface 16 by a spindle motor (not shown). In some configurations, control circuitry may include distinct servo control, fly height control, laser control, read/write channel paths for actuator 20, head 18 and disk surface 16 (and data written thereon).

As shown in FIG. 1C, control circuitry 22 may include firmware configured to execute an example method 60 for determining write operating conditions using the data storage device configuration in FIGS. 1A and 1B. The method in FIG. 1C is described from the perspective of controlling write and read operations through head 18 on actuator 20 to disk surface 16.

FIG. 1C illustrates a process flow diagram with blocks 60-74 representing steps for detecting and analyzing mode hops and thermal gradient changes using harmonic sensor 56. The method 60 may be executed by the control circuitry 22 of the data storage device 10. The method 60 may result in the detection and characterization of mode hops and thermal gradient changes during write operations. This method may enable the data storage device to optimize its performance and reliability by adjusting operating parameters based on the detected phenomena.

At block 62, a head may be positioned over a test track on the disk surface. For example, the control circuitry may instruct the voice control motor to move the actuator arm and position the head over a designated test track on the disk surface.

At block 64, a tone pattern may be written to the test track using the head. For example, the control circuitry may generate a specific tone pattern, such as a 2T pattern, and instruct the write element to record this pattern on the test track while the laser heats the disk surface.

At block 66, acquisition windows for a harmonic sensor may be configured. For example, the control circuitry may set up specific time intervals or sector portions within which the harmonic sensor will collect data from the read signal.

At block 68, the harmonic sensor may be configured with specific acquisition frequencies. For example, the control circuitry may program the harmonic sensor to sample the read signal at predetermined frequencies, including the tone frequency and its upper and lower skirt frequencies.

At block 70, amplitude data may be acquired using the configured harmonic sensor. For example, the harmonic sensor may collect and store amplitude values for the specified frequencies as the head reads back the written tone pattern.

At block 72, phase error may be determined based on the acquired amplitude data. For example, the control circuitry may process the amplitude values from the harmonic sensor to calculate phase differences between the written and read signals.

At block 74, the calculated phase errors may be correlated to mode hop events and thermal gradient changes. For example, the control circuitry may analyze the pattern of phase errors across the test track to identify sudden shifts indicative of mode hops or gradual changes suggesting thermal gradient variations.

Figure 2:
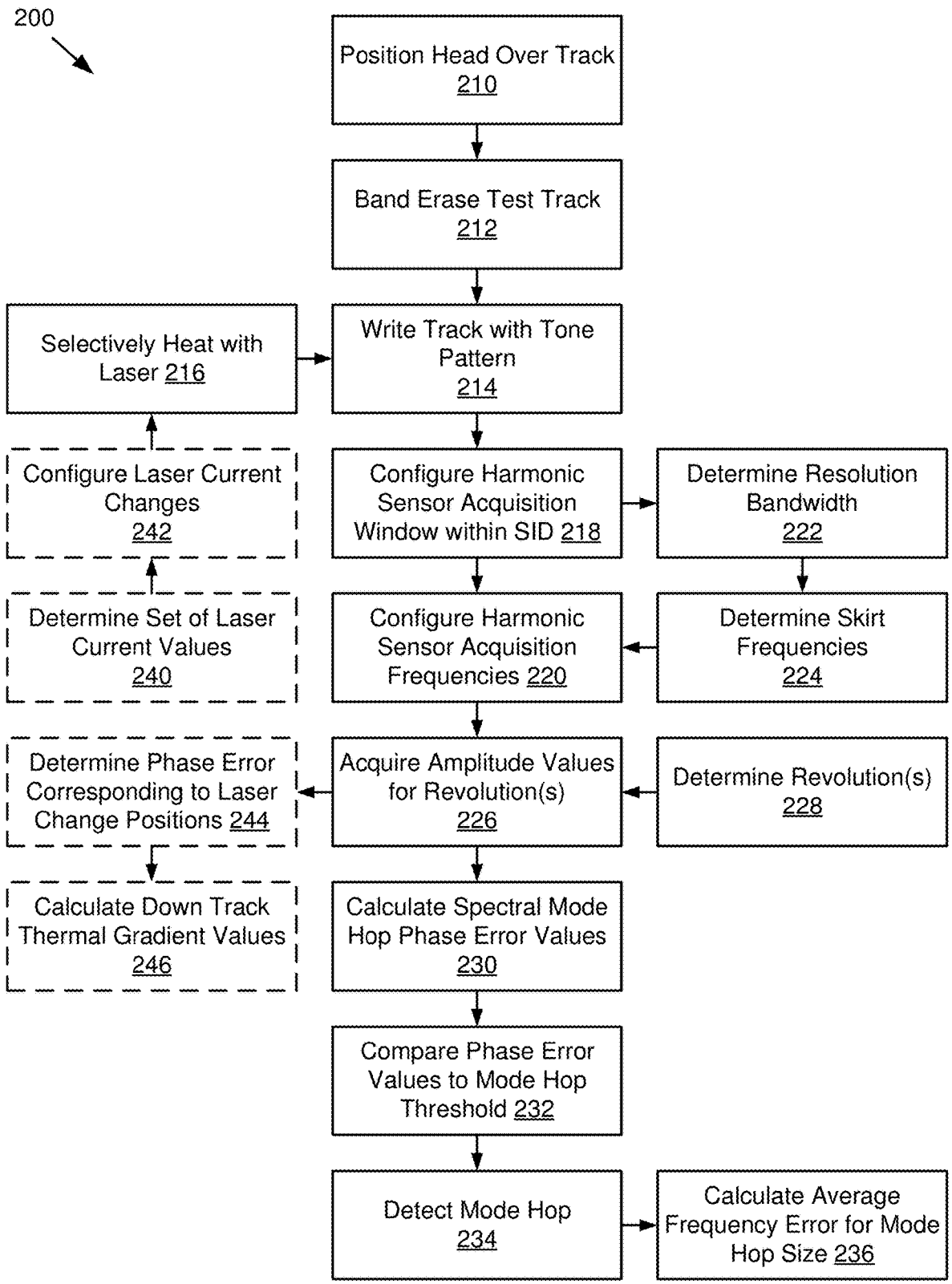
FIG. 2 is an example method of using a harmonic sensor for phase error detection in support mode hop and/or down track thermal gradient detection and measurement.

Referring to FIG. 2, the figure illustrates a flowchart of a method 200 for detecting mode hops in a data storage device and, optionally, determining down track thermal gradients. The method 200 may begin with block 210, where a head 18 may be positioned over a track on the non-volatile storage medium, such as disk surface 16. This positioning may be achieved through the actuation of the head 18 by an actuator arm 24, which may be controlled by a voice control motor. The voice control motor may receive a VCM control signal 28 from control circuitry 22, which may also receive a read signal 26 from the head 18 and may communicate with a host device.

At block 212, a test track on the disk surface 16 may be band erased. This process may involve the use of the write element 48 in the head 18 to remove any previously written data from the test track, potentially preparing it for the writing of a new tone pattern.

Following the band erase operation, at block 214 may involve writing a tone pattern to the test track. This may be achieved by the write element 48 in the head 18, which may write the tone pattern to the test track on the disk surface 16. Typically, the selected tone pattern may be selected based on the magnetic resolution of the storage medium and a target data bit resolution for the data format, where the tone pattern is at a frequency that is a multiple of the bit pattern, such as 2T, 3T, 4T etc.

At block 216, the head 18 may heat the non-volatile storage medium using a laser source 52 during the writing of the tone pattern. The laser source 52 may be controlled by the control circuitry 22 to modulate the output power of the laser, potentially changing the size of the thermal spot generated by the near-field transducer (NFT) in the head 18. The selective heating may be based on a current set of write parameters that include laser current and timing values configured for data write operations. The selective heating may be systematically varied during write operations to optionally determine thermal down track gradient using blocks 242-246.

The method 200 may then proceed to block 218, where the control circuitry 22 may configure the harmonic sensor acquisition window to equal the length of the tone write within the sector identifier (SID) and may set the number of windows to acquire to 1.

At block 220, the control circuitry 22 may configure the harmonic sensor acquisition frequencies. For example, for a 2T tone pattern, the 2T and 2T+/−1/resolution bandwidth (carrier, lower skirt frequency, upper skirt frequency) may be selected as acquisition frequencies. This configuration may allow the harmonic sensor to detect changes in the frequency of the read signal that may correspond to mode hops in the laser source 52.

At block 222, the control circuitry 22 may determine the resolution bandwidth based on the acquisition windows. For example, the resolution bandwidth may be the reciprocal of the acquisition window duration.

At block 224, the control circuitry 22 may determine the skirt frequencies. The tone frequency may provide the carrier frequency and the skirt frequencies may be determined relative to the tone frequency at the reciprocal of the resolution bandwidth above and below the tone frequency.

At block 226, the control circuitry may acquire amplitude values during one or more revolutions of the disk. This may involve the harmonic sensor measuring the amplitude of the read signal at the configured acquisition frequencies for a revolution of the disk surface 16 and measurement at each sector and corresponding sector identifier.

At block 230, the control circuitry 22 may calculate the spectral mode hop signal, which corresponds to phase error values determined from the amplitude data of the harmonic sensor. For example, each phase error value may be calculated as (lower skirt amplitude−upper skirt amplitude)/carrier frequency. This calculation may provide a measure of the phase shift introduced by the mode hop, which may be used to detect the occurrence of the mode hop.

At block 232, the control circuitry may compare phase error values to mode hop threshold values to determine mode hop events from the calculated phase error signal. If the mode hop signal exceeds the threshold, this may indicate that a mode hop has occurred and a mode hop is detected at block 234. In some configurations, when a mode hop is detected, further actions may be triggered, such as adjusting the operating parameters of the data storage device to mitigate the effects of the mode hop on future write operations.

At block 236, the control circuitry 22 may calculate the average frequency error from the side skirt slope and delta to quantify the size of a mode hop detected at block 234. This calculation may provide a measure of the magnitude of the mode hop, which may be used to assess the impact of the mode hop on the performance of the data storage device.

In some configurations, method 200 may be used to optionally determine down track thermal gradient values by changing laser power and predetermined intervals around the revolution. For example, at blocks 240 and 242 the step changes in laser current may be configured and at blocks 244 and 246 the amplitude values from the harmonic sensor may be used to calculate down track thermal gradient values by correlating phase errors to changes in laser current.

At block 240, the control circuitry 22 may determine a set of laser current values. For example, the laser may have an operating current range and the control circuitry may include a step size corresponding to one or more notches in the laser current control for determining the set of laser current values that will be used over the course of the write operation for the tone pattern.

At block 242, the control circuitry 22 may configure the laser current changes to occur at a set time/position intervals. For example, the steps in the set of laser current values may be initiated based on sector identifiers and/or timing related to sector identifiers to position the current changes in known positions along the tone pattern.

At block 244, the control circuitry 22 may use the amplitude values from the harmonic sensor to determine phase shift corresponding to laser change positions. Similar to block 230, phase error may be determined from the acquired amplitudes based on the pulse widths using three sample points. The spectral phase error signal may be mapped to the laser change positions based on the sector identifiers.

At block 246, the control circuitry 22 may determine down track thermal gradient values for the range of laser currents. For example, based on the corresponding phase error values, thermal gradient values may be calculated for each laser current used.

In some configurations, the method 200 may be implemented by control circuitry 22 in a data storage device 10. The control circuitry 22 may include the harmonic sensor 56 and a processor, memory, and other components that may enable it to execute the method 200. The control circuitry 22 may be configured to execute the method 200 in response to a command from a host device, test system, or as part of a routine field operation of the data storage device 10. The method 200 may provide a way to detect mode hops in a data storage device 10, potentially enabling the data storage device to optimize its performance and reliability by adjusting its operating parameters based on the detected mode hops.

Figure 3:
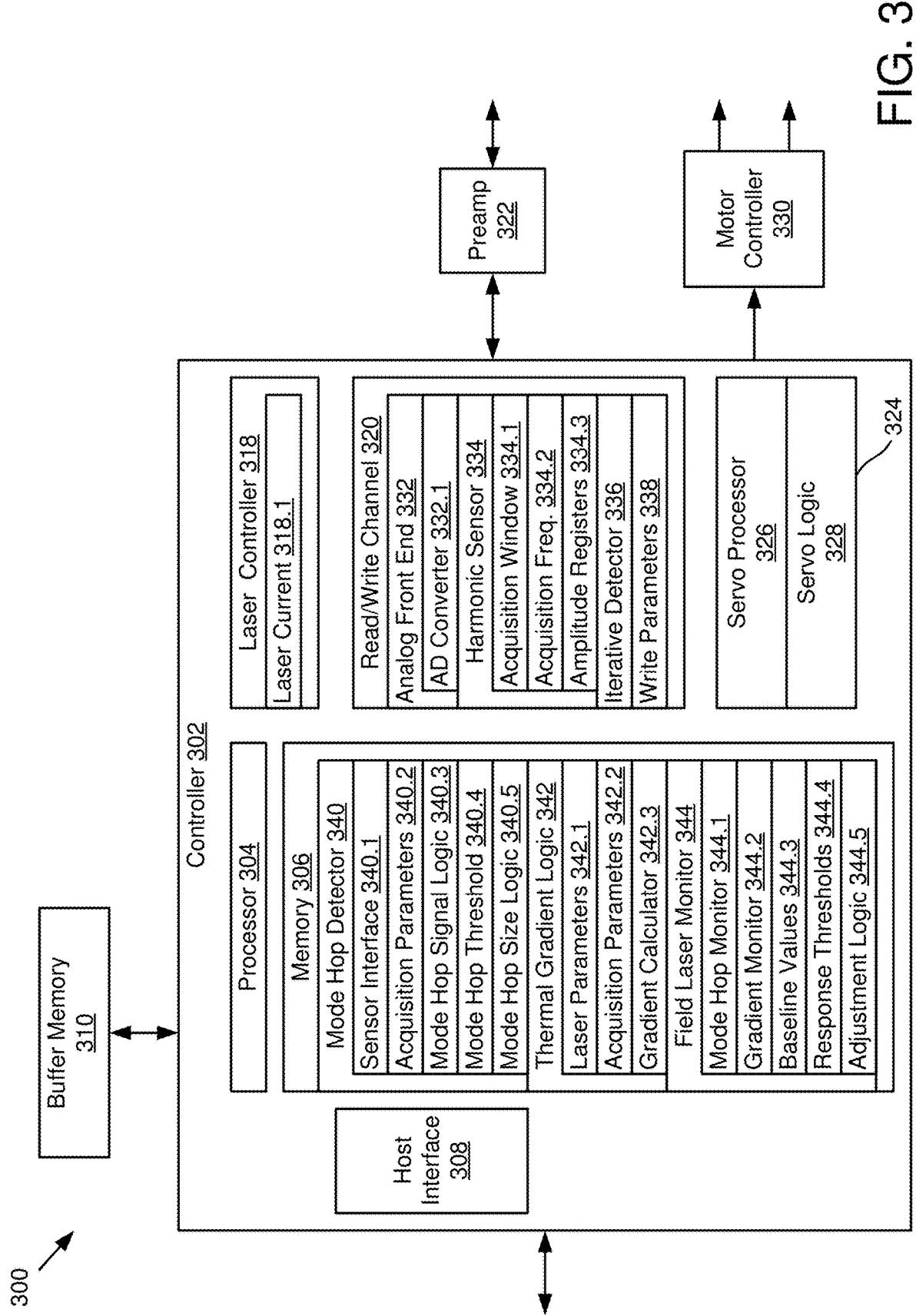
FIG. 3 is a block diagram of a configuration of data storage device electronics for harmonic sensor based phase error detection in a HAMR data storage device.

FIG. 3 shows a portion of example control circuitry 300 for a HAMR data storage device, such as the disk drive of FIGS. 1A-1C. In the example shown, control circuitry 300 may include one or more controllers 302. Controller 302 may comprise a hardware storage device controller circuit configured to receive host storage commands, process storage operations for writing, reading, and managing data stored to non-volatile storage media in the disk drive, such as the magnetic media disks in FIGS. 1A and 1B. In some configurations, some functions of controller 302 may be offloaded to a connected tester system during drive qualification and testing during the manufacturing process. In some configurations, the functions of controller 302 may be embodied solely within the control circuitry of the data storage device for field operation after the manufacturing process is complete.

Controller 302 may comprise a processor 304, a memory 306, a host interface 308, and access to a buffer memory 310. Controllers 302 may also comprise a laser controller 318, a read/write channel 320, and a servo controller 324 including a servo processor 326 and servo logic 328. In some embodiments, one or more of host interface 308, laser controller 318, read/write channel 320, and servo controller 324 may be embodied in separate packages, such as ASICs, SOCs, or other specialized circuits that interface with processor 304 and memory 306 for carrying out their respective functions. Controller 302 may include physical and electrical interfaces for connecting to buffer memory 310, preamp 322, motor controller 330, other controllers, and/or other circuitry components. In some embodiments, the components of controller 302 may be interconnected by a bus that includes one or more conductors that permit communication among the components. For example, processor 304, memory 306, host interface 308, laser controller 318, read/write channel 320, and/or servo controller 324 may be components attached to a PCBA that provides one or more layers of interconnect conductors among the components.

Processor 304 may include any type of conventional processor or microprocessor that interprets and executes instructions. Memory 306 may include a random access memory (RAM) or another type of dynamic storage device that stores information and instructions for execution by processor 304 and/or a read only memory (ROM) or another type of static storage device that stores static information and instructions for use by processor 304 and/or any suitable storage element, such as a system portion of a hard disk media or a solid state storage element. Memory 306 may be configured to store firmware instructions comprising one or more modules or sub-modules for specific data storage device operations and processor 304 may execute those instructions, including controlling communication with other components, such as host interface 308, buffer memory 310, laser controller 318, read/write channel 320, and servo controller 324.

Host interface 308 may include any transceiver-like mechanism that enables the data storage device to communicate with other devices and/or systems, such as a host system for which the storage device provides data storage. Host interface 308 may comprise a host storage interface compliant with one or more storage interface standards, such as a Serial Advanced Technology Attachment (SATA) interface, a Small Computer System Interface (SCSI), serial attached SCSI (SAS), peripheral computer interface express (PCIe), etc., for connecting host interface 308 to peripheral interface or network port.

Buffer memory 310 may include a RAM, flash, or another type of dynamic storage device for storing host data and other information in transit between the storage media of the storage device and the host (via host interface 308). In some embodiments, buffer memory 310 is a separate memory device from memory 306 and the disk surfaces of the storage device.

Laser controller 316 may include a power controller and related logic in a specialized circuit for controlling the operation of a laser, such as a laser diode or NFT in the head of a HAMR data storage device. For example, laser controller 316 may regulate the power signal to the laser to turn the laser on and off. In some configurations, laser controller 316 may control multiple power settings determining the amount of power or current provided to the laser and resulting emissions of laser energy. In some configurations, laser controller 316 may control the laser to emit a pulse and laser controller parameters may determine the power, timing, frequency, and other characteristics of the pulse. In some configurations, a physical (wired) connection from laser controller 316 to the laser in the head may be provided through flex cable connection from controller 302 to the actuator supporting the head. In some configurations, laser controller 316 may provide an interface and set of commands and/or parameters that may be controlled by firmware stored in memory 306.

Read/write channel 320 may include one or more specialized circuits configured for processing binary data to be written to the disk surfaces using an analog write signal and processing the analog read signal from the disk surfaces back into binary data. For example, read/write channel 320 may include a write path comprised of various data scramblers, run-length limited (RLL) encoders, iterative error correction code (ECC) encoders, write precompensation circuits, and other data or signal processing components. In some configurations, the write path may be configured with a set of write parameters 338 configured to determine various characteristics of the signal provide to the write head during write operations. Write parameters 338 may include a write current, write signal timing values, overshoot values, laser control values (including laser current), and other parameters that control the characteristics of the write field that writes to the magnetic storage medium. In addition to writing user data to the data sectors of the storage medium, read/write channel 320 may be configured to write test patterns, such as tone patterns having a desired frequency that set a repeating pattern of bits along the data track.

Read/write channel 320 may include a read path comprised of various amplifiers, filters, equalizers, analog-to-digital converters (ADCs), soft information detectors, iterative ECC decoders, and other data or signal processing components. Read/write channel 320 may provide the analog write signal to and receive the analog read signal from preamp 322, which controls and amplifies signals to and from the heads. In some configurations, read/write channel 320 may include: an analog front end 332 configured to receive and condition the analog read signal and sample it into a digital read signal for further processing; a harmonic sensor 334 configured to determine frequency error data from the digital read signal based on a target harmonic frequency for use in managing timing and other parameters in the read channel; and an iterative detector 336 configured to detect and decode data bits from the digital read signal to return previously stored data.

Analog front end 332 may be configured to receive the analog read signal from preamp 322 and convert it into a digital read signal for processing by other components of read/write channel 320. For example, analog front end 332 may include an ADC 332.1 that receives an analog data signal from preamp 322 and generates a digital signal for use by other components of read/write channel 320. In some configurations, analog front end 332 may include a timing circuit, and one or more filters, equalizers, and/or other signal conditioning components for generating the digital read signal. In some configurations, analog front end 332 may rely on filtering, equalization, and other analog signal conditioning to be carried out by preamp 322. In some configurations, a timing circuit for the read channel may be embodied in analog front end 332, digital components of read/write channel 320, and/or a combination thereof and may provide timing to other data processing circuits, such as harmonic sensor 334 and iterative detector 336.

Harmonic sensor 334 may be a hardware circuit configured to determine spectral amplitude data from the digital read signal. For example, harmonic sensor 334 may accumulate digital samples from analog front end 332 and process them through one or more arithmetic units to determine frequency error relative to a selected harmonic and save the resulting values in a set of amplitude registers. In some configurations, harmonic sensor 334 may accept input settings for determining how digital sample values are acquired and aggregated. For example, harmonic sensor 334 may receive an acquisition window parameter 334.1 that determines when, during a given read operation, samples are to be collected. Acquisition window parameter 334.1 may be defined in terms of read timing relative to sector identifiers or similar identifiers denoting position along a data track. For another example, harmonic sensor 334 may receive one or more acquisition frequencies 234.2 denoting the sampling frequency for one or more frequency error calculations. For some applications, a single sampling frequency aligned with a data or tone frequency may be used to determine frequency error for an incoming read signal. For determining phase error, a pulse width of the frequency signal may be used and at least two additional sample points (represented by additional acquisition frequencies) may be set using acquisition frequencies 334.2. In some configurations, three data points per pulse may be set with acquisition frequencies representing the target frequency of a previously written tone pattern, the upper skirt frequency, and the lower skirt frequency. Amplitude data corresponding to acquisition frequencies 334.2 during acquisition window 334.1 may be accumulated in amplitude registers 334.3 to use by other system components. For example, processor 304 may execute controller firmware in memory 306 to access amplitude values from amplitude registers 334.3 and use them for further calculations, such as by mod hop detector 340 or thermal gradient logic 342.

Iterative detector 336 may be configured to receive read data from the read heads and use iterative bit detection and ECC processing to decode the received read data into decoded data for further processing by controller firmware and/or communication to the host. For example, iterative detector 336 may include one or more bit detectors, such as soft output Viterbi algorithm (SOVA) detectors, and one or more iterative decoders, such as low density parity check (LDPC) decoders operating on multi-bit encoded symbols to decode each sector of data received by read/write channel 320. Iterative detector 336 may receive a digital read signal from ADC 332.1 in analog front end 332. Iterative detector 336 may output decoded data units from one or more data sectors to controller firmware.

Servo controller 324 may include one or more specialized circuits configured to process servo data, such as position error signals, from the disk surfaces and providing a control signal to position the actuators in a closed-loop control system. Servo controller 324 may also receive commands from processor 304 for positioning operations, such as seek, track follow, load, unload, sweep, idle, and other actuator positioning operations. Servo controller 324 may also implement servo error recovery processes for recovering from servo errors. In some embodiments, servo controller 324 may include servo processor 326 and servo logic 328 (stored in a servo memory). For example, servo processor 326 may be a dedicated processor circuit and servo logic 328 may be firmware stored in RAM associated with the dedicated processor to provide dedicated computing resources for managing the servo functions. Servo controller 324 may provide servo control signals to motor controller 330 and motor controller 330 may control one or more actuator VCMs and/or a spindle motor for rotating the disk stack.

Control circuitry 300 may include a plurality of modules or subsystems that are stored and/or instantiated in memory 306 for execution by processor 304 as instructions or operations. For example, memory 306 may include a mode hop detector configured to detect mode hops based on phase error (sometime referred to as phase shift or phase delta) from the amplitude data signal produced by harmonic sensor 334 from the digital read signal. Memory 306 may include thermal gradient logic configured to determine down track thermal gradient across a range of laser powers from similar harmonic sensor amplitude data. Memory 306 may include a field laser monitor 344 configured to use mode hop detector 340 and/or thermal gradient logic 342 to monitor laser operating conditions and selectively trigger adjustment of write operations and/or device health parameters over the operating life of the data storage device in the field. In some configurations, some or all of the features or functions for these modules or subsystems may be embodied in specialized hardware circuits in read/write channel 320 rather than controller firmware executed by processor 304.

Mode hop detector 340 may include a set of functions, parameters, interfaces, and data structures for detecting mode hops based on amplitude data from harmonic sensor 334. For example, mode hop detector 340 may include a sensor interface 340.1 that includes interface logic for accessing the amplitude data values from amplitude registers 334.3. In some configurations, sensor interface 340.1 may also support providing acquisition parameters 340.2 to harmonic sensor 334 for configuring acquisition window 334.1, acquisition frequencies 334.1, and/or other acquisition parameters for one or more read operations to scan for mode hops from previously written tone pattern data.

Figure 4A:
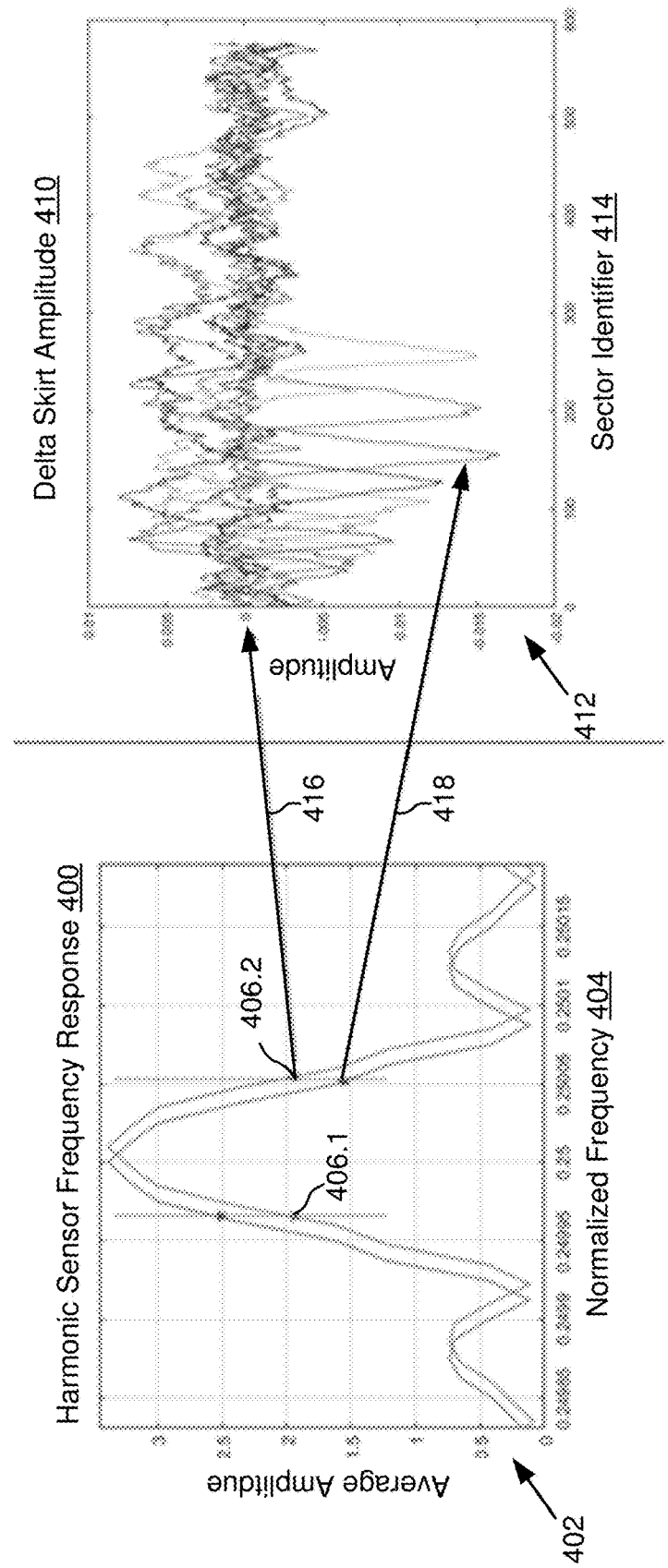
FIG. 4A are example graphs of using harmonic sensor data to determine phase error.
Figure 4B:
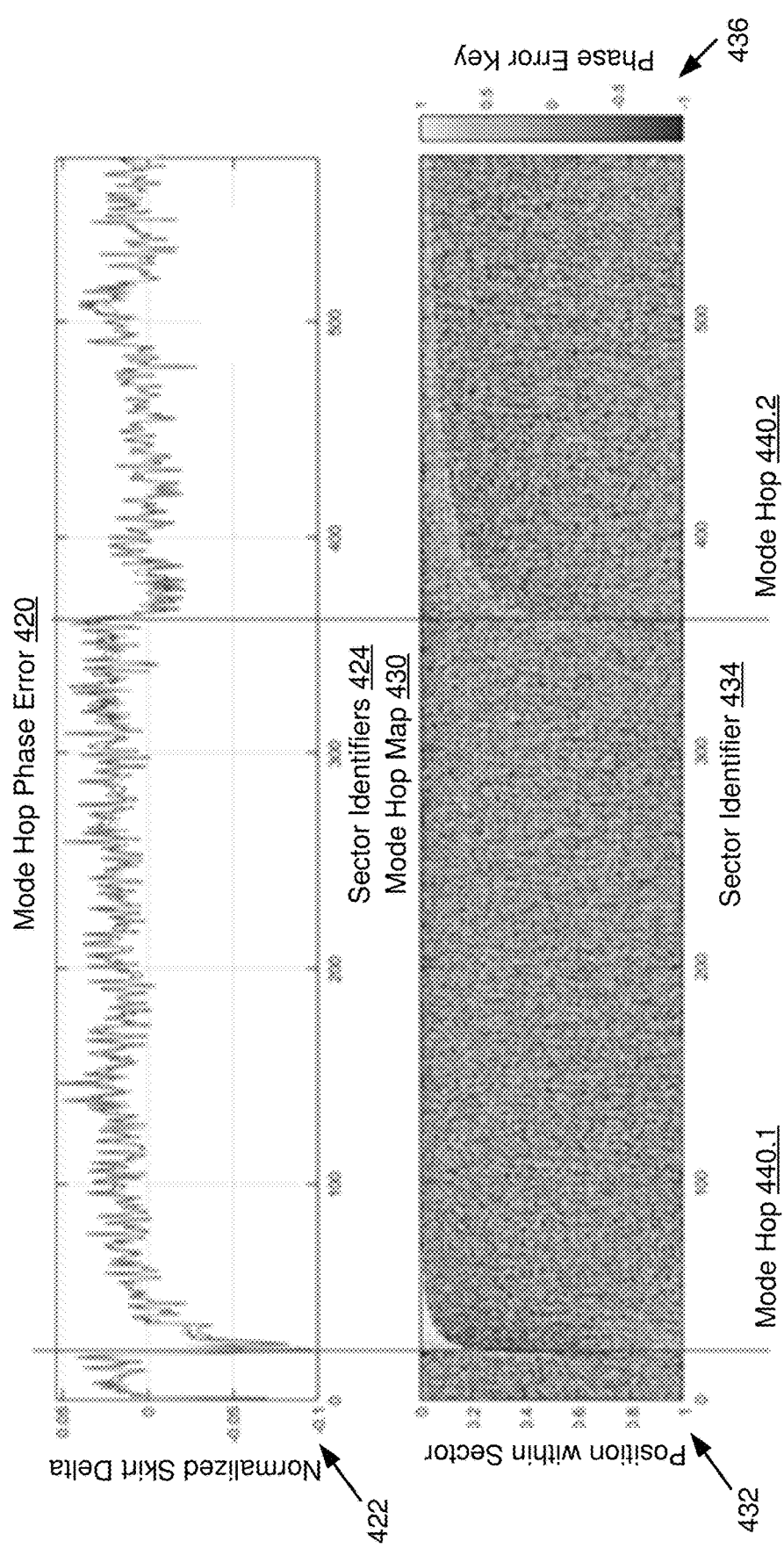
FIG. 4B are example graphs of using phase error data based on the harmonic sensor data to detect mode hops.

Mode hop signal logic 340.3 may include functions for calculating a mode hop signal based on the phase error of the received amplitude data from harmonic sensor 334. Referring to FIG. 4A, the harmonic sensor frequency response in graph 400 may be sampled at multiple data points (skirt frequencies) to determine phase error based on delta skirt amplitudes as shown in graph 410. Harmonic sensor frequency response graph 400 has an average amplitude y-axis 402 and normalized frequency x-axis 404 and shows two curves representing a target frequency response across tone peaks compared to an actual frequency response from read signal data. Example skirt frequencies 406.1 and 406.2 demonstrate how differences in frequency amplitude (frequency error) may be sampled away from the peak value to calculate delta values corresponding to phase error. Delta skirt amplitude graph 410 has an amplitude y-axes 412 and a sector identifier x-axis 414 showing different resulting delta skirt amplitudes for different acquisition windows around a revolution of the disk (or length of the tone pattern track). The 0-amplitude 416 corresponds to no phase error and amplitude peaks 418 in either direction represent larger delta skirt amplitudes and corresponding phase error. Mode hop signal logic 340.3 may include logic for using the harmonic sensor values to calculate phase error based on the difference in skirt amplitudes. For example, by calculating the difference between the upper skirt frequency and the lower skirt frequency for the average frequency amplitudes across a sector, phase error may be determined across multiple sectors, as shown in FIG. 4B. In some configurations, a relationship among these data points may be determined using a least squares fit to determine the phase error relative to the target frequency. Alternatively, a relationship among more than three amplitude values may be used to determine the phase error per peak. Mode hop phase error graph 420 includes a normalized skirt delta y-axis 422 and sector identifiers x-axis 424. A large change in skirt delta may correspond to a mode hop, such as mode hops 440.1 and 440.2. Mode hop map 430 includes position within sector y-axis 432 and the same sector identifiers x-axis 434 to show how the mode hops align in the two representations of the phase error data. Mode hop map 430 plots phase error indicators based on their sector and position within the sector using phase error key 436 to show the corresponding shades. Mode hop threshold 430.4 may be a phase error threshold or similar logic for locating mode hop events in the phase error data, such as the data represented in FIG. 4B. For example, a phase error amplitude change based on normalized skirt delta meeting a configurable mode hop threshold may be used to detect mode hops and return their magnitude and location (by sector identifier). In some configurations, mode hop detector 340 may also include mode hop size logic 340.5 configured to determine a mode hop size associated with a detected mode hop. For example, mode hop size logic 340.5 may calculate average frequency error to quantify the size of the detected mode hop (in relative terms).

Thermal gradient logic 342 may include a set of functions, parameters, interfaces, and data structures for determining down track thermal gradients based on amplitude data from harmonic sensor 334. For example, thermal gradient logic 342 may include a sensor interface and set acquisition parameters 342.2 similar to mode hop detector 340 to use harmonic sensor 334 to gather the amplitude data for thermal gradient calculations. Thermal gradient logic 342 may also include an interface to laser controller 318 to enable the logic to control laser current 318.1. Laser controller 318 may receive parameters or signals for setting laser current directly or through read/write channel 320 and a command may be provided to allow controller firmware to override or change laser current to a set value for a particular operation, such as a test write operation for a tone pattern. In some configurations, laser parameters 342.1 may include notch settings for laser current 318.1 and correspond to a range of currents, steps, and operating periods for writing corresponding portions of the tone pattern across one or more sectors. Once the tone pattern is written with the varying laser currents with known positional correlations to sector identifiers, a subsequent read operation may be used to gather corresponding amplitude data through harmonic sensor 334.

Figure 5:
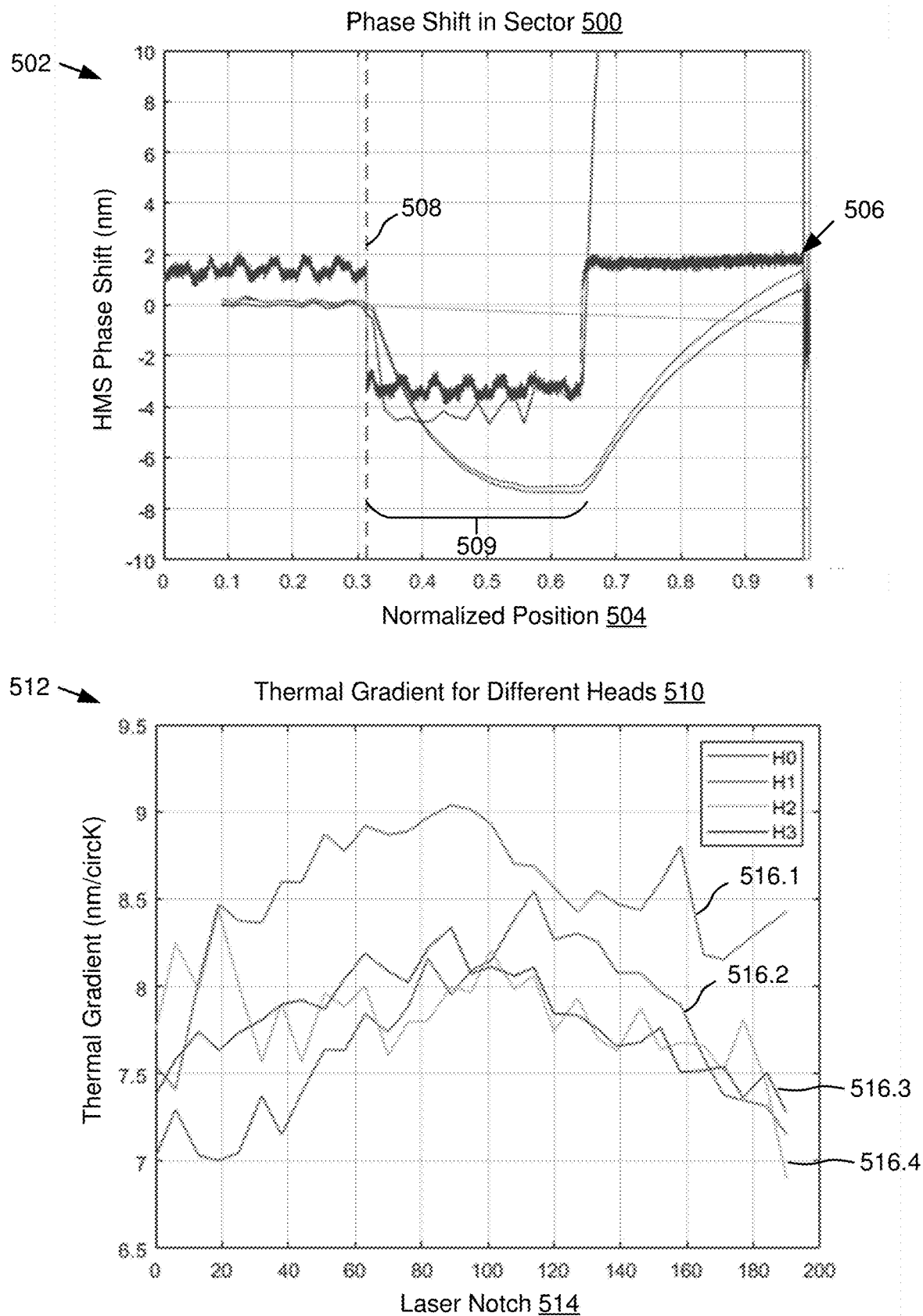
FIG. 5 are example graphs of using phase error data based on the harmonic sensor data to measure down track thermal gradient.

Gradient calculator 342.3 may include logic for calculating down track thermal gradients that correlate the laser current to the size of the thermal spot produced by the laser and, more specifically, the range (in nanometers) of the thermal change in the down track direction. Gradient calculator 342.3 may use frequency amplitude data from harmonic sensor 334 to calculate phase error from the tone pattern written in the sector data with varying power. As shown in FIG. 5, the phase error (referred to as phase shift) in the sector may be correlated with sector position information. Phase shift in sector graph 500 includes a harmonic sensor (HMS) phase shift y-axis 502 and a normalized position (within the sector) x-axis 504. Curve 506 demonstrates a step shift in phase error coinciding with laser power change 508 and the window length 509 of that power change. Gradient calculator 342.3 may further include logic for using the phase error values for each laser power value and corresponding position information to determine the thermal gradient in nanometers per unit of thermal conductivity (circK). Gradient calculator 342.3 may calculate and collect thermal gradient values across the range of laser current values used. In FIG. 5, thermal gradient for different heads graph 510 includes a thermal gradient y-axis and a laser notch x-axis 514. Curves 516.1-516.4 correspond to down track thermal gradients at various laser notches (current settings) across an operating range of the laser for four different heads. The curve for each head would be calculated independently by gradient calculator 342.3. Gradient calculator 342.3 may provide a quantification of thermal gradient for a particular head-media at a specific operating time. Change in thermal gradient may be determined by comparing calculations of the thermal gradient for a head at different times in the operating life of a data storage device.

Field laser monitor 344 may include a set of functions, parameters, interfaces, and data structures for using mode hop detector 340 and/or thermal gradient logic 342 to monitor the write operating condition of the laser during field operations and trigger further actions when changes meet one or more response thresholds. For example, mode hops may be monitored for their impact on write risk margining and the down track thermal gradient may be monitored for changes in laser operation and/or interface degradation. Either may also be used for forensic analysis of errors or failures. Similar functions may be employed during manufacturing test process to set data format margin, adjust related write parameters, and/or support parametric sector selection. At the component level, similar functions could be used for screening heads for insufficient thermal gradient and/or excessive mode hops.

In some configurations, field laser monitor 344 may include a mode hop monitor 344.1 configured to periodically monitor operating conditions related to mode hops to determine whether they are impacting device performance or failure risk. Laser and wave guide temperature and optical interference conditions may change during the life of a data storage device. Periodic measurement of mode hops using mode hop detector 340 may be integrated into the health monitoring of a data storage device based on scheduled background health scans or drive health monitoring triggered by increasing error rates or another trigger condition. An increase in the number or size of mode hops may lead to increased error rates and field laser monitor 344 may be configured to respond to the mode hop changes to mitigate those changes in one or more ways. For example, increased mod hop events or sizes may trigger adjustments to laser current configured to find an operating point with fewer or smaller mod hops; risk factor weighting parameters for adjacent track interference may be adjusted based on mode hop size and polarity; laser current may be adjusted to account for the change in erase or write widths caused by the increased mod hops (and represented by write width parameters, such as erase width or magnetic write width, or the change in mod hops over time may be mapped to a degradation model for risk or failure prediction. In some configurations, test tracks for mode hop detector 340 may be written when performance variation is noted (such as changes in error rates). These test track may be analyzed independent of when they are written and field laser monitor 344 may perform a forensic analysis of multiple test tracks written over time to detect trends and determine whether adjustments should be made to the recording conditions, such as various write parameters, to improve performance.

In some configurations, field laser monitor 344 may include a gradient monitor 344.2 configured to periodically monitor operating conditions related to down track thermal gradients to determine whether they are impacting device performance or failure risk. The thermal gradient is the scaling factor that relates the change in laser power to the change in width and position shift of the written data. When thermal gradient is low, a small change in laser power can introduce large changes in track width. Changes in thermal gradient over time may represent degradation of the laser and/or the head-disk interface that may be compensated for by changes in other write parameters and/or may represent factors contributing to overall failure risk and the operating life of the drive. Similarly, there may be thermal gradients that are out of acceptable operating conditions because they represent underheating or overheating that would make controlling writes or getting desired bit densities or margin for a particular data storage device configuration difficult. Periodic measurement of down track thermal gradients using thermal gradient logic 342 may be integrated into the health monitoring of a data storage device based on scheduled background health scans or drive health monitoring triggered by increasing error rates or another trigger condition. For example, periodic or forensic thermal gradient testing may be used as an input to a drive health monitor system and one or more model parameters related to predicting device operating life, failure, and data risk. Both increasing and decreasing thermal gradients can be signs of degradation in system performance or reliability. Low gradients may be an indication of physical degradation of the NFT, other laser components, or the smear formed between the laser and the disk at the head-disk interface. One cause of loss of thermal gradient may be smear formation and low thermal gradients or gradient changes may meet a response threshold, such as a smear removal threshold, for triggering a smear removal procedure or operation. Low thermal gradient may also be an indication that the erase width is increasing. Low thermal gradient or gradient changes may meet a response threshold for triggering adjustment of laser current or other write parameters to adjust the adjacent track interference factor weighting and corresponding weighting parameters. High thermal gradient may be an indicator of head-media spacing changes or physical changes in the laser or the smear. High thermal gradient may trigger head-disk interface adjustments using fly height control parameters, media maintenance routines, adjustments to laser currents or other write parameters, or adjustment of model parameters for drive health monitoring, which may trigger further testing of laser operating conditions, including mode hop detection.

In some configurations, both mode hop monitor 344.1 and gradient monitor 344.2 may collect baseline values 344.2 and/or track calculated values for their respective write operating conditions over time. For example, mode hop monitor 344.1 and gradient monitor 344.2 may each establish baseline values 344.3 at an initial time point in the field operation of the device and use it for comparison to determine changing values over time. Baseline values 344.3 may be periodic replaced and/or added to over time to provide historic data regarding the write operating conditions for the laser that may be used for trend analysis and/or measuring value changes for triggering adjustments to operating conditions. Field laser monitor 344 may include sets of response thresholds 344.4 for determining when response should be initiated for a detected absolute value or change in the measured mode hops or thermal gradients. For example, response thresholds 344.4 may include one or more change thresholds related to frequency and/or size of mode hops, high or low thermal gradients, and/or thermal gradient changes for determine when controller 302 should make adjustments to write operating parameters and/or risk monitoring parameters. Field laser monitor 344.4 may include adjustment logic 344.5 for determining what actions are triggered by meeting one or more response thresholds 344.4. For example, adjustment logic 344.5 may include a set of logic rules mapped to response thresholds 344.4 to determine what parameters should be adjusted among write operating parameters and/or risk monitoring parameters. In some configurations, adjustment logic 344.5 may initiate further test operations, diagnostics, and/or remediation by calling such functions by passing an initialization parameter to that function, such as initiating a smear removal function or laser diagnostic function.

Figure 6:
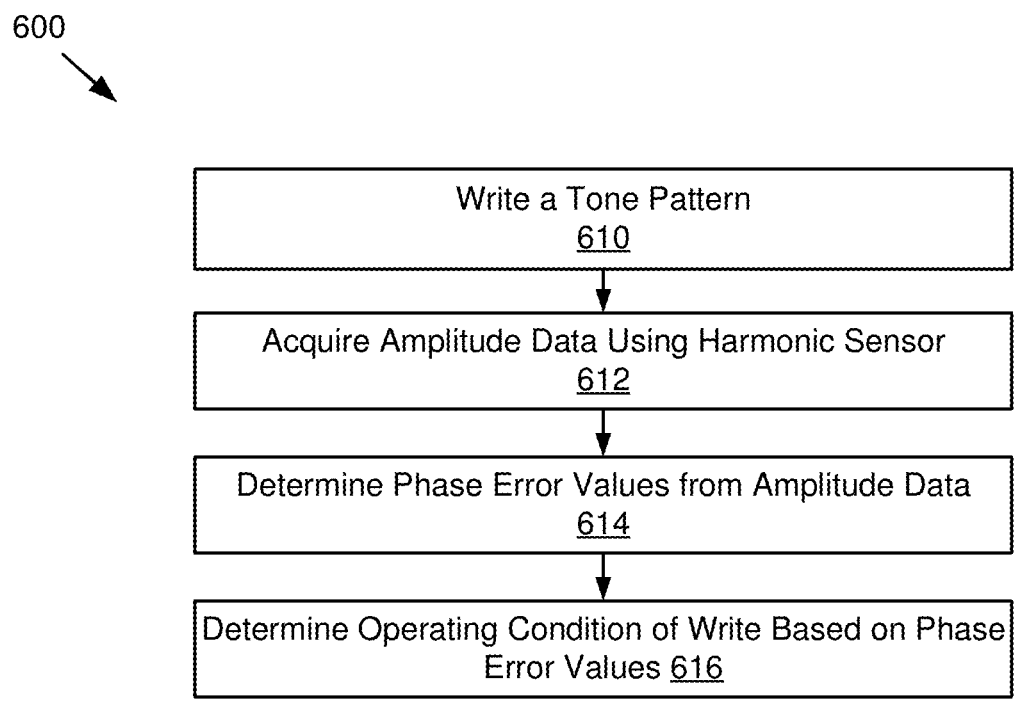
FIG. 6 is an example method of using a harmonic sensor to determine operating conditions of writes based on phase error.

FIG. 6 illustrates a flowchart for a method 600 of determining an operating condition during a write operation. The method 600 may be executed by the control circuitry of a data storage device, such as control circuitry 22 of data storage device 10 or control circuitry 300. The method 600 may result in the identification of specific operating conditions, such as mode hops or thermal gradients, during write operations based on subsequent analysis of a read signal from the previously written test track. This method may enable the data storage device to optimize its performance and reliability by detecting and responding to changes in write conditions.

At block 610, a tone pattern may be written to a track on the non-volatile storage medium. For example, the control circuitry may instruct the write element to record a specific frequency pattern, such as a 2T pattern, onto a designated test track while the laser heats the disk surface.

At block 612, amplitude data may be acquired using a harmonic sensor. For example, the harmonic sensor in the read channel may sample the read signal at predetermined frequencies, including the tone frequency and its upper and lower skirt frequencies, as the head reads back the written tone pattern.

At block 614, phase error values may be determined from the acquired amplitude data. For example, the control circuitry may process the amplitude values from the harmonic sensor to calculate phase differences between the written pattern and read signals, potentially using a formula such as (lower skirt amplitude–upper skirt amplitude)/carrier frequency.

At block 616, an operating condition of the write operation may be determined based on the phase error values. For example, the control circuitry may analyze the pattern of phase errors across the test track to identify phase errors indicative of mode hops or thermal gradient variations, which may indicate specific operating conditions of the laser or other write components.

Figure 7:
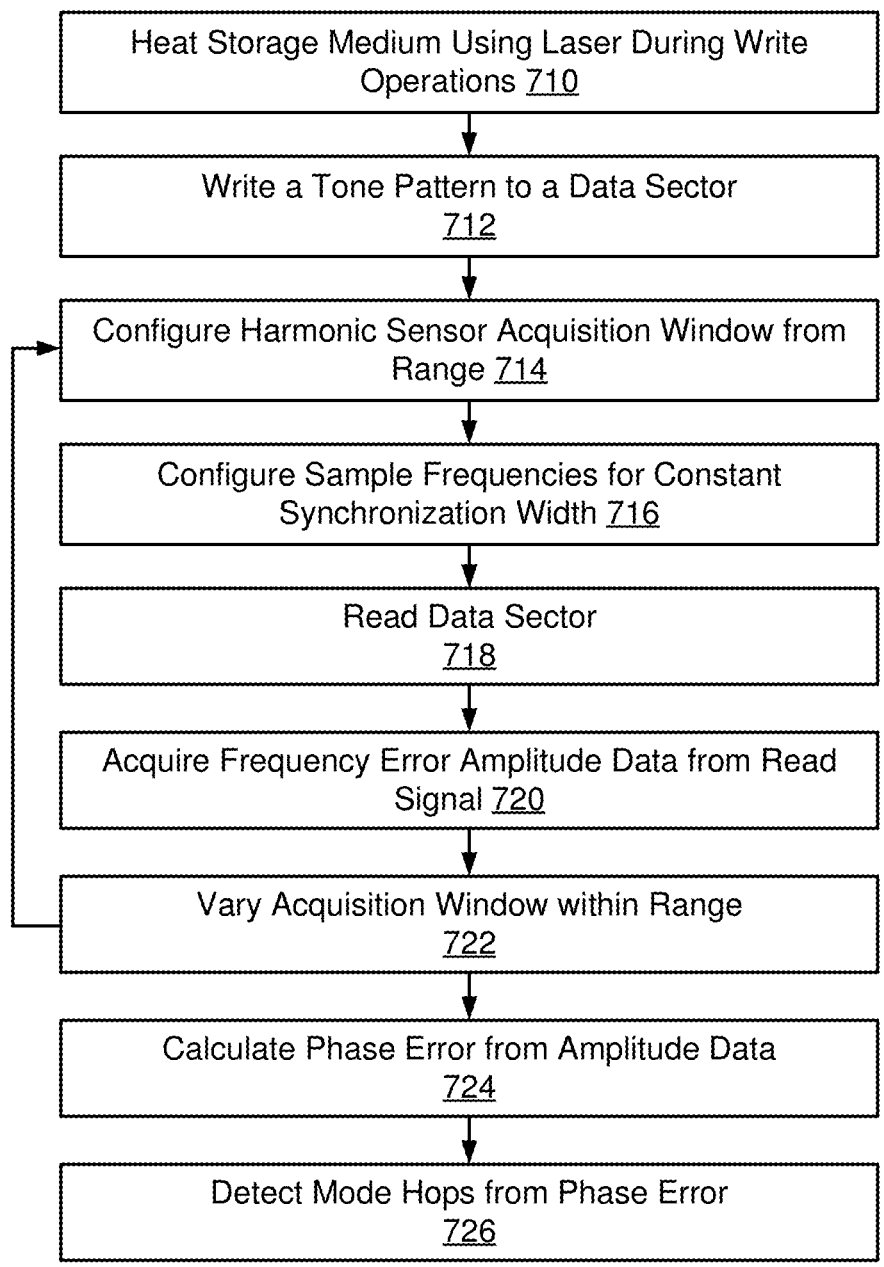
FIG. 7 is an example method of using a harmonic sensor to detect mode hops with varying acquisition windows.

FIG. 7 illustrates a flowchart of a method 700 for detecting mode hops in a data storage device using a laser during write operations. The method 700 may be executed by the control circuitry of a data storage device, such as control circuitry 22 of data storage device 10 or control circuitry 300. The method 700 may result in the detection of mode hops during write operations based on subsequent analysis of a read back signal from the test pattern. This method may enable the data storage device to identify and characterize laser mode hops by analyzing phase errors in written data patterns.

At block 710, a storage medium may be heated using a laser during write operations. For example, the control circuitry may activate a laser source in the head to heat the disk surface while writing data, altering the magnetic properties of the storage medium.

At block 712, a tone pattern may be written to a data sector. For example, the control circuitry may instruct the write element to record a specific frequency pattern, such as a 2T pattern, onto a designated sector of the disk surface.

At block 714, a harmonic sensor acquisition window may be configured from a range. For example, the control circuitry may set up a specific time interval or sector portion within which the harmonic sensor will collect data from the read signal, potentially adjusting the window size to capture different aspects of the written pattern.

At block 716, sample frequencies may be configured for constant synchronization width. For example, the control circuitry may program the harmonic sensor to sample the read signal at predetermined frequencies, including the tone frequency and its upper and lower skirt frequencies, ensuring consistent data collection across different acquisition windows.

At block 718, the data sector may be read. For example, the control circuitry may instruct the read element to scan the previously written sector, generating a read signal that contains information about the written tone pattern.

At block 720, frequency error amplitude data may be acquired from the read signal. For example, the harmonic sensor may measure and record the amplitude values at the configured sample frequencies, potentially detecting deviations from the expected tone pattern.

At block 722, the acquisition window may be varied within the range. For example, the control circuitry may adjust the size or position of the acquisition window, potentially allowing for a more comprehensive analysis of the written data across different portions of the sector.

At block 724, phase error may be calculated from the amplitude data. For example, the control circuitry may process the frequency error amplitude data to determine phase differences between the written and read signals, potentially using a formula such as (lower skirt amplitude–upper skirt amplitude)/carrier frequency.

At block 726, mode hops may be detected from the phase error. For example, the control circuitry may analyze the calculated phase errors, looking for sudden shifts or patterns that may indicate the occurrence of laser mode hops during the write operation.

Figure 8:
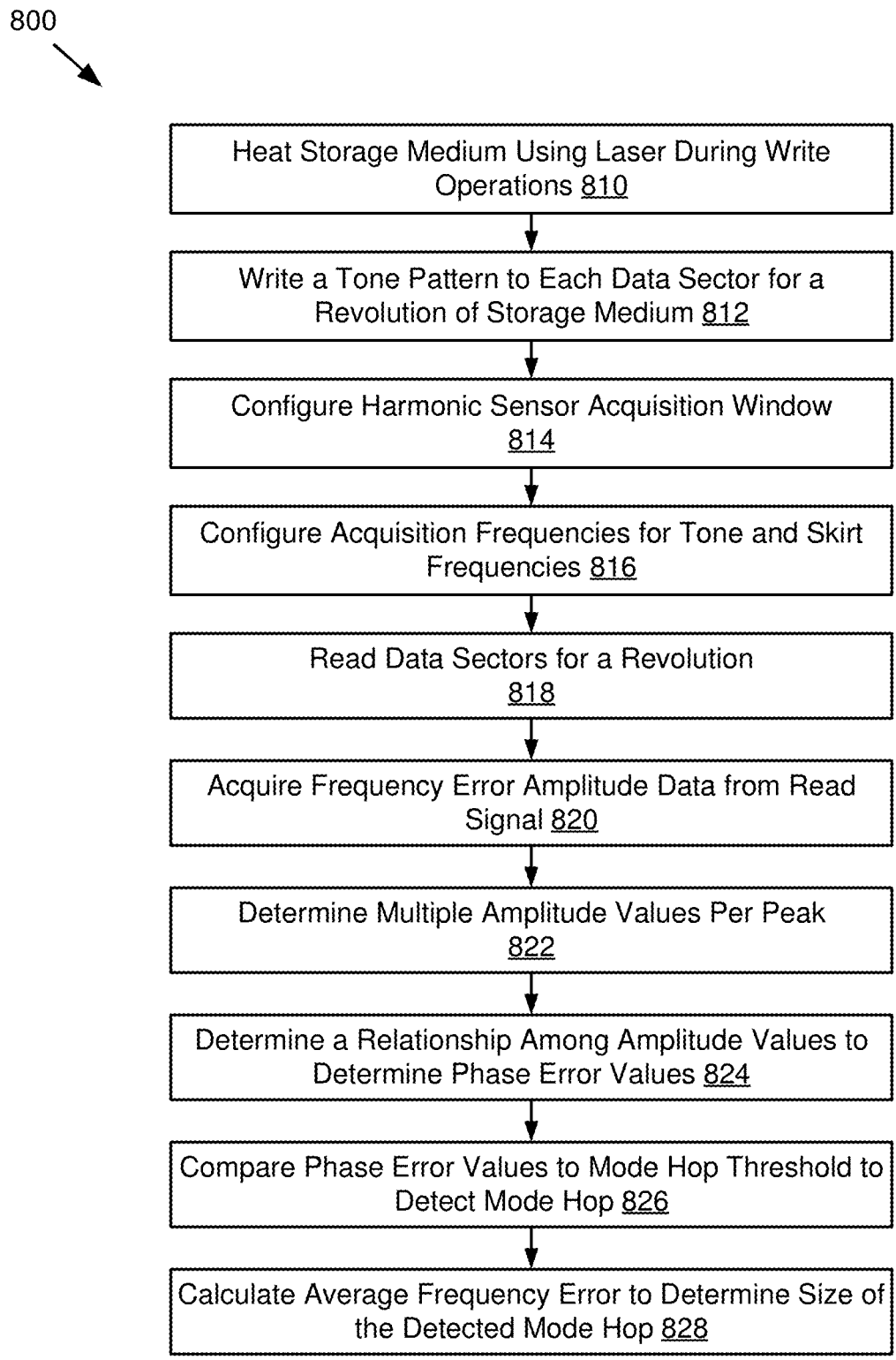
FIG. 8 is an example method of using a harmonic sensor to detect mode hops based on multiple sector samples during disk revolution.

FIG. 8 illustrates a flowchart of a method 800 for detecting mode hops in a data storage device using a harmonic sensor. The method 800 may be executed by the control circuitry of a data storage device, such as control circuitry 22 of data storage device 10 or control circuitry 300. The method 800 may result in the detection and quantification of mode hops during write operations based on subsequent analysis of a read signal from the previously written test track. This method may provide a structured approach for identifying and characterizing mode hops in a data storage device using harmonic sensor measurements.

At block 810, a storage medium may be heated using a laser during write operations. For example, the control circuitry may activate the laser source in the head to heat the disk surface while writing data, altering the magnetic properties of the storage medium.

At block 812, a tone pattern may be written to each data sector for a revolution of the storage medium. For example, the control circuitry may instruct the write element to record a specific frequency pattern, such as a 2T pattern, onto each sector of the disk surface for one complete revolution.

At block 814, a harmonic sensor acquisition window may be configured. For example, the control circuitry may set up a specific time interval or sector portion within which the harmonic sensor will collect data from the read signal.

At block 816, acquisition frequencies may be configured for the tone and skirt frequencies. For example, the control circuitry may program the harmonic sensor to sample the read signal at predetermined frequencies, including the tone frequency and its upper and lower skirt frequencies.

At block 818, data sectors may be read for a revolution of the storage medium. For example, the control circuitry may instruct the read element to scan the previously written sectors for one complete revolution of the disk, generating a read signal that contains information about the written tone pattern.

At block 820, frequency error amplitude data may be acquired from the read signal. For example, the harmonic sensor may measure and record the amplitude values at the configured acquisition frequencies for each sector.

At block 822, multiple amplitude values may be determined per peak. For example, the control circuitry may determine at least three amplitude values corresponding to the anticipated peak frequency amplitude, an upper skirt frequency amplitude, and a lower skirt frequency amplitude for each peak.

At block 824, the relationship among these amplitude values may be compared to the target frequency to determine phase error values. For example, the control circuitry may use a least squares fit on the acquired sets of amplitude values to determine phase error values for each sector relative to the target peaks.

At block 826, the phase error values may be compared to a mode hop threshold to detect mode hops. For example, the control circuitry may analyze the calculated phase errors, looking for values or differences in adjacent values that exceed a predetermined threshold, which may indicate the occurrence of laser mode hops during the write operation.

At block 828, an average frequency error may be calculated to determine the size of the detected mode hop. For example, the control circuitry may compute the average of the frequency errors associated with the detected mode hops to quantify their magnitude, which may be used to assess their impact on the data storage device's performance.

Figure 9:
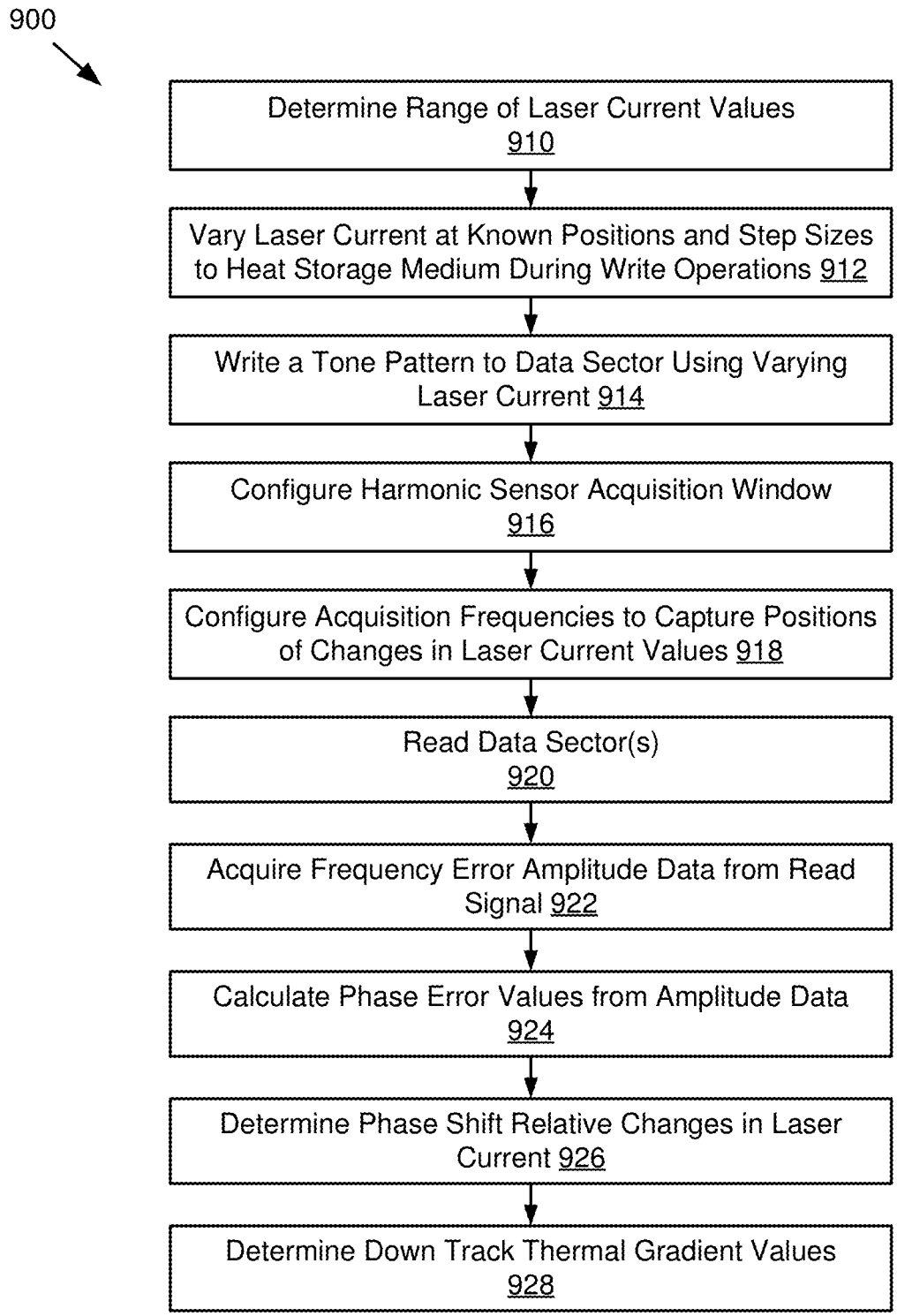
FIG. 9 is an example method of using a harmonic sensor to determine down track thermal gradients.

FIG. 9 illustrates a flowchart of a method 900 for determining down track thermal gradient values in a data storage device. The method 900 may be executed by the control circuitry of a data storage device, such as control circuitry 22 of data storage device 10 or control circuitry 300. The method 900 may result in the calculation of down track thermal gradient values for different laser power settings. This method may enable the data storage device to characterize the thermal behavior of the write process and optimize its performance based on the thermal gradient measurements.

At block 910, a range of laser current values may be determined. For example, the control circuitry may define a set of laser current values spanning the operational range of the laser, potentially including multiple incremental steps between the minimum and maximum current settings.

At block 912, the laser current may be varied at known positions and step sizes to heat the storage medium during write operations. For example, the control circuitry may instruct the laser controller to adjust the laser current at predetermined intervals during the write process, potentially corresponding to specific sector or track positions on the disk surface.

At block 914, a tone pattern may be written to a data sector using the varying laser current. For example, the control circuitry may command the write element to record a specific frequency pattern, such as a 2T pattern, while the laser current is systematically varied according to the predetermined steps and positions.

At block 916, a harmonic sensor acquisition window may be configured. For example, the control circuitry may set up specific time intervals or sector portions within which the harmonic sensor will collect data from the read signal, potentially aligning these windows with the positions of laser current changes.

At block 918, acquisition frequencies may be configured to capture positions of changes in laser current values. For example, the control circuitry may program the harmonic sensor to sample the read signal at frequencies corresponding to the tone pattern and additional frequencies that may reveal phase shifts due to laser current changes, such as upper and lower skirt frequencies for each peak in the tone pattern.

At block 920, the data sector(s) may be read. For example, the control circuitry may instruct the read element to scan the previously written sector(s), generating a read signal that contains information about the written tone pattern and any phase shifts induced by laser current variations.

At block 922, frequency error amplitude data may be acquired from the read signal. For example, the harmonic sensor may measure and record the amplitude values at the configured acquisition frequencies, potentially detecting deviations from the expected tone pattern that correspond to laser current changes.

At block 924, phase error values may be calculated from the amplitude data. For example, the control circuitry may process the frequency error amplitude data to determine phase differences between the written and read signals, potentially using a formula such as (lower skirt amplitude–upper skirt amplitude)/carrier frequency.

At block 926, the phase shift relative to changes in laser current may be determined. For example, the control circuitry may analyze the calculated phase errors in relation to the known positions and magnitudes of laser current changes, potentially establishing a correlation between laser power and phase shift.

At block 928, down track thermal gradient values may be determined based on the previous steps. For example, the control circuitry may use the relationship between laser current changes and observed phase shifts to calculate the thermal gradient, potentially expressing it as a change in written position per unit change in laser power.

Figure 10:
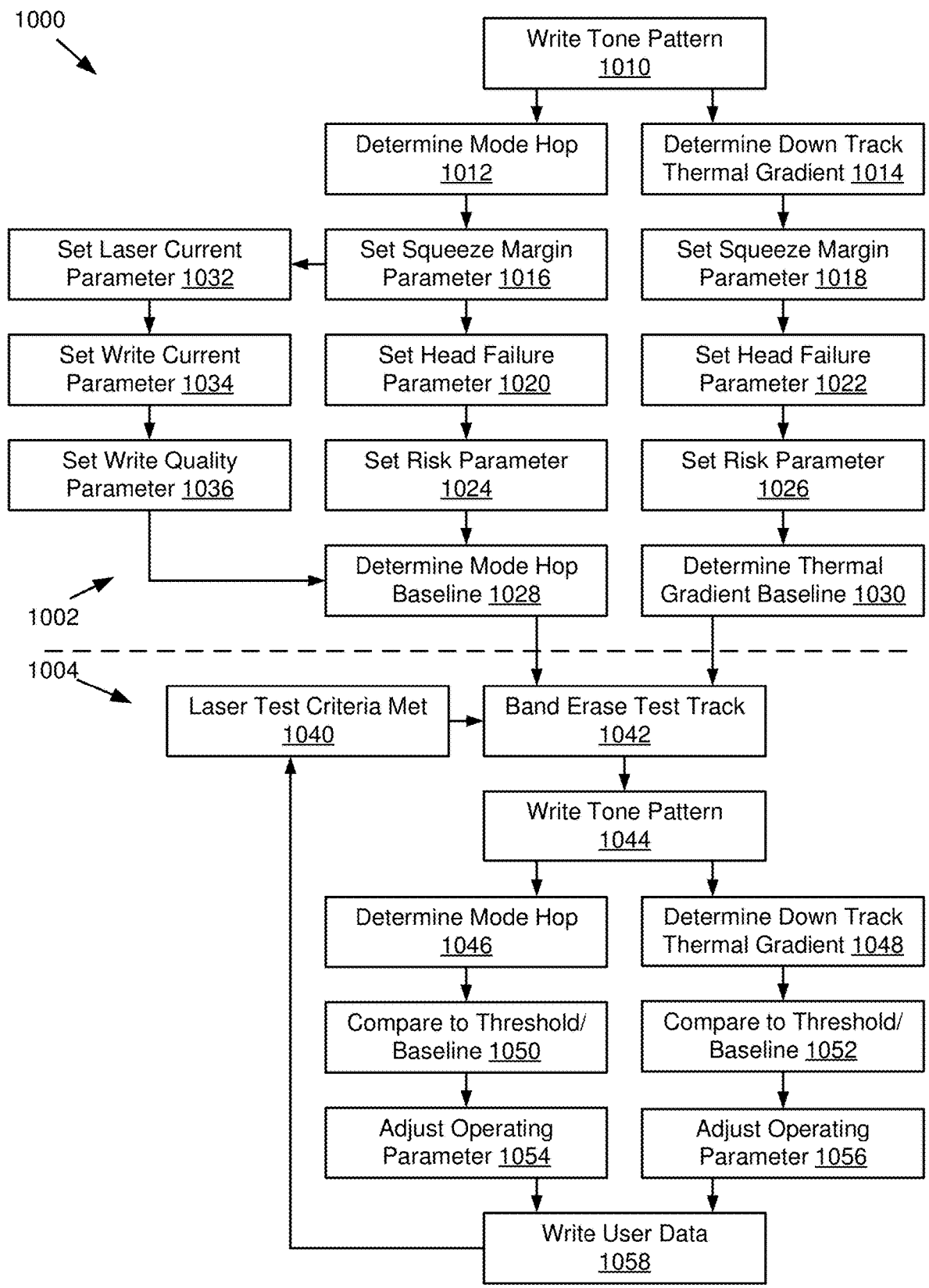
FIG. 10 is an example method of using a harmonic sensor to determine operating conditions and adjust parameters during testing or field use of a data storage device.

FIG. 10 illustrates a flowchart of a method 1000 for operating a data storage device to use efficient mode hop and down track thermal gradient measurements for device manufacturing and testing and improved field operation. The method 1000 may be executed by the control circuitry of a data storage device, such as control circuitry 22 of data storage device 10 or control circuitry 300. In some configurations, another computer system, such as a test system in communication with the data storage device, may perform one or more functions related to method 1000 during test operations. The method 1000 may result in optimized performance and reliability of the data storage device through detection and management of mode hops and thermal gradients. This method may encompass both manufacturing operations 1002 and field operations 1004, utilizing harmonic sensor measurements to adjust operating parameters and monitor device health.

At block 1010, a tone pattern may be written to a test track. For example, the control circuitry may instruct the write element to record a specific frequency pattern, such as a 2T pattern, onto a designated test track while the laser heats the disk surface.

At block 1012, mode hop may be determined from the written tone pattern. For example, the control circuitry may analyze the read signal from the test track using a harmonic sensor to detect sudden phase shifts indicative of laser mode hops using the methods described above for FIGS. 7 and/or 8.

At block 1014, down track thermal gradient may be determined from the written tone pattern. For example, the control circuitry may analyze the read signal to using the harmonic sensor to calculate phase shifts corresponding to different laser power settings, deriving thermal gradient values using the method described above for FIG. 9.

At block 1016, a squeeze margin parameter may be set based on the mode hop determination. For example, the control circuitry may adjust the track format parameters to account for detected mode hops, potentially increasing or decreasing track spacing.

At block 1018, a squeeze margin parameter may be set based on the thermal gradient determination. For example, the control circuitry may adjust track format parameters based on the calculated thermal gradient values to optimize data density and reliability.

At block 1020, a head failure parameter may be set based on the mode hop determination. For example, the control circuitry may determine that the head performance is out of range due to the frequency or size of mode hops and update the failure parameter evaluated against failure criteria for failing the head.

At block 1022, a head failure parameter may be set based on the thermal gradient determination. For example, the control circuitry may determine that the head performance is out of range due to thermal gradients that are either too high or too low and update the failure parameter evaluated against failure criteria for failing the head.

At block 1024, a risk parameter may be set based on the mode hop determination. For example, the control circuitry may update risk assessment models for data integrity based on the frequency and magnitude of detected mode hops.

At block 1026, a risk parameter may be set based on the thermal gradient determination. For example, the control circuitry may adjust risk assessment models based on thermal gradient values, which may affect write width and position accuracy.

At block 1028, a mode hop baseline may be determined. For example, the control circuitry may establish initial mode hop characteristics during manufacturing for later comparison during field operations.

At block 1030, a thermal gradient baseline may be determined. For example, the control circuitry may establish initial thermal gradient values during manufacturing for later comparison during field operations.

At block 1032, a laser current parameter may be set based on the mode hop determination. For example, the control circuitry may adjust laser current settings to minimize the occurrence of mode hops during write operations.

At block 1034, a write current parameter may be set based on the mode hop determination. For example, the control circuitry may adjust write current settings to compensate for the effects of mode hops on write field strength.

At block 1036, a write quality parameter may be set based on the mode hop determination. For example, the control circuitry may update write quality thresholds based on the detected mode hop characteristics.

At block 1040, laser test criteria may be checked. For example, the control circuitry may periodically evaluate predefined conditions to determine if a laser test should be performed during field operation, such as read error rates exceeding a test threshold or heroic data recovery being triggered for failed read operations.

At block 1042, a test track may be band erased. For example, if the laser test criteria are met, the control circuitry may instruct the write element to erase a designated test track in preparation for writing a new tone pattern.

At block 1044, a tone pattern may be written to the test track. For example, the control circuitry may instruct the write element to record a specific frequency pattern onto the prepared test track. In some configurations, different test tracks may be written for mode hop detection and down track thermal gradient measurement, varying the laser power for the thermal gradient test track.

At block 1046, at least one mode hop may be determined from the written tone pattern. For example, the control circuitry may analyze the read signal from the test track using the harmonic sensor to detect and characterize any mode hops that occurred during writing.

At block 1048, down track thermal gradient may be determined from the written tone pattern. For example, the control circuitry may analyze the read signal from the test track using the harmonic sensor to calculate current thermal gradient values based on phase shifts in the written data.

At block 1050, the determined mode hop may be compared to a threshold or baseline. For example, the control circuitry may compare the detected mode hop characteristics to predetermined thresholds or the baseline established during manufacturing.

At block 1052, the determined thermal gradient may be compared to a threshold or baseline. For example, the control circuitry may compare the calculated thermal gradient values to predetermined response thresholds or the baseline established during manufacturing or a prior mode hop test operation.

At block 1054, operating parameters may be adjusted based on the mode hop comparison. For example, if the mode hop characteristics exceed one or more thresholds, the control circuitry may adjust laser current, write current, or other parameters to mitigate the effects of mode hops.

At block 1056, operating parameters may be adjusted based on the thermal gradient comparison. For example, if thermal gradient values deviate significantly from the baseline, the control circuitry may adjust laser power, fly height, or other parameters to optimize write performance.

At block 1058, user data may be written using the adjusted operating parameters. For example, the control circuitry may apply the newly adjusted parameters during normal write operations to maintain optimal performance and reliability of the data storage device.

Technology for improved detection of write operating conditions in data storage devices using the harmonic sensor to support phase error calculations indicative of laser operating conditions is described above. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to particular hardware.

Reference in the specification to "one embodiment" or "an embodiment" means that a particular feature, structure, or characteristic described in connection with the embodiment is included in at least one embodiment or implementation of the disclosed technologies. The appearances of the phrase "in one embodiment" in various places in the specification are not necessarily all referring to the same embodiment or implementation.

Some portions of the detailed descriptions above may be presented in terms of processes and symbolic representations of operations on data bits within a computer memory. A process can generally be considered a self-consistent sequence of operations leading to a result. The operations may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), erasable programmable read-only memories (EPROMs), electrically erasable programmable read-only memories (EEPROMs), magnetic or optical cards, flash memories including universal serial bus (USB) keys with non-volatile memory or any type of media suitable for storing electronic instructions, each coupled to a computer system bus.

The disclosed technologies can take the form of an entire hardware implementation, an entire software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The terms storage media, storage device, and data blocks are used interchangeably throughout the present disclosure to refer to the physical media upon which the data is stored.

Finally, the processes and displays presented herein may not be inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A data storage device, comprising:
a non-volatile storage medium;
a head actuated over the non-volatile storage medium; and
control circuitry configured to:
  write, using the head, a tone pattern to at least one track on the non-volatile storage medium;
  acquire, using a harmonic sensor in a read channel configured to receive a read signal from the head, amplitude data from the tone pattern and corresponding to differences between a target frequency of the tone pattern and a read frequency from the read signal;
  determine, based on the amplitude data, a plurality of phase error values; and
  determine, based on the plurality of phase error values, an operating condition during the write.

2. The data storage device of claim 1, wherein:
the head comprises a laser configured to heat the non-volatile storage medium while writing data to the non-volatile storage medium; and
the operating condition corresponds to an operating characteristic of the laser.

3. The data storage device of claim 2, wherein:
the operating condition comprises at least one mode hop of the laser;
the control circuitry is further configured to:
  configure an acquisition window of the harmonic sensor corresponding to a sector portion of the at least one track; and
  configure a set of acquisition frequencies of the harmonic sensor corresponding to a plurality of data points proximate the target frequency of the tone pattern; and
determining the operating condition comprises detecting the at least one mode hop based on a comparison of amplitude data values at the set of acquisition frequencies to determine the plurality of phase error values.

4. The data storage device of claim 3, wherein detecting the at least one mode hop comprises:
determining, using the set of acquisition frequencies, at least three data points for a target peak;
determining a relationship among the at least three data points to determine a phase error value; and
comparing the phase error value to a mode hop threshold to determine that the at least one mode hop has been detected.

5. The data storage device of claim 4, wherein determining the operating condition further comprises calculating an average frequency error to quantify a size of the at least one mode hop.

6. The data storage device of claim 3, wherein:
the non-volatile storage medium comprises a rotating disk;
the at least one track comprises a plurality of sector portions along a length of the at least one track; and
acquiring the amplitude data comprises sampling frequency error for the set of acquisition frequencies at the plurality of sector portions for at least one revolution of the rotating disk.

7. The data storage device of claim 3, wherein the control circuitry is further configured to, during field operation of the data storage device:
band erase, prior to writing the tone pattern, the at least one track;
adjust, responsive to detecting the at least one mode hop and based on at least one parameter corresponding to the at least one mode hop, at least one operating parameter selected from:
  a first laser current parameter selected to reduce mode hops;
  a second laser current parameter selected to compensate for changing write widths based on a size of the at least one mode hop;
  an adjacent track interference weighting parameter based on the size of the at least one mode hop; and
  a risk parameter correlating the size of the at least one mode hop to degradation of the head; and
write, to the non-volatile storage medium, user data using the adjusted at least one operating parameter.

8. The data storage device of claim 2, wherein:
the operating condition comprises a down track thermal gradient value correlating changes in laser power to changes in position of written data;
the control circuitry is further configured to:
  configure an acquisition window of the harmonic sensor corresponding to a sector portion of the at least one track;
  determine a range of laser current values used during writing the tone pattern in the sector portion; and
  configure a set of acquisition frequencies of the harmonic sensor corresponding to positions of changes in laser current value across the range of laser current values; and
determining the operating condition comprises using the plurality of phase error values to calculate phase shift relative to the changes in laser power to determine corresponding set of down track thermal gradient values.

9. The data storage device of claim 8, wherein the control circuitry is further configured to:
determine a baseline set of down track thermal gradient values;
compare, during field operation of the data storage device, the corresponding set of down track thermal gradient values to the baseline set of down track thermal gradient values to generate at least one thermal gradient change value;
adjust, responsive to the at least one thermal gradient change value meeting a change threshold, at least one operating parameter selected from:
  a laser current parameter selected to adjust down track thermal gradient based on the at least one thermal gradient change value;
  an adjacent track interference weighting parameter based on a correlation between down track thermal gradient values and a write width parameter;
  a risk parameter correlating the at least one thermal gradient change to degradation of the head;
  a smear removal threshold for initiating a smear removal operation based on low down track thermal gradient values; and
  a thermal fly height control parameter to adjust head-media spacing based on the at least one thermal gradient change; and
write, to the non-volatile storage medium, user data using the adjusted at least one operating parameter.

10. The data storage device of claim 2, wherein the control circuitry is further configured to set, prior to field operation of the data storage device and based on the plurality of phase error values, at least one parameter selected from:
- a squeeze margin parameter for determining track format based on at least one mode hop measurement;
- a squeeze margin parameter for determining track format based on at least one down track thermal gradient measurement;
- a head failure parameter based on at least one mode hop measurement meeting at least one failure threshold;
- a head failure parameter based on at least one down track thermal gradient measurement meeting at least one failure threshold;
- a laser current parameter based on mode hop measurements to reduce mode hops during write operations;
- a write current parameter based on mode hop measurements to reduce mode hops during write operations;
- a write quality parameter based on mode hop measurements to qualify data sectors; and
- a risk parameter based on changes in at least one down track thermal gradient measurement over a test time.

11. A method comprising:
- writing, using a head actuated over a non-volatile storage medium of a data storage device, a tone pattern to at least one track on the non-volatile storage medium;
- acquiring, using a harmonic sensor in a read channel configured to receive a read signal from the head, amplitude data from the tone pattern and corresponding to differences between a target frequency of the tone pattern and a read frequency from the read signal;
- determining, based on the amplitude data, a plurality of phase error values; and
- determining, based on the plurality of phase error values, an operating condition during the writing.

12. The method of claim 11, further comprising:
- heating, using a laser in the head, the non-volatile storage medium while writing data to the non-volatile storage medium, wherein the operating condition corresponds to an operating characteristic of the laser.

13. The method of claim 12, further comprising:
- configuring an acquisition window of the harmonic sensor corresponding to a sector portion of the at least one track;
- configuring a set of acquisition frequencies of the harmonic sensor corresponding to a plurality of data points proximate the target frequency of the tone pattern; and
- detecting, based on a comparison of amplitude data values at the set of acquisition frequencies to determine the plurality of phase error values, at least one mode hop of the laser, wherein the operating condition comprises the at least one mode hop of the laser.

14. The method of claim 13, wherein detecting the at least one mode hop comprises:
- determining, using the set of acquisition frequencies, at least three data points for a target peak;
- determining a relationship among the at least three data points to determine a phase error value; and
- comparing the phase error value to a mode hop threshold to determine that the at least one mode hop has been detected.

15. The method of claim 14, wherein determining the operating condition further comprises calculating an average frequency error to quantify a size of the at least one mode hop.

16. The method of claim 13, wherein:
- the non-volatile storage medium comprises a rotating disk;
- the at least one track comprises a plurality of sector portions along a length of the at least one track; and
- acquiring the amplitude data comprises sampling frequency error for the set of acquisition frequencies at the plurality of sector portions for at least one revolution of the rotating disk.

17. The method of claim 13, further comprising, during field operation of the data storage device:
- band erasing, prior to writing the tone pattern, the at least one track;
- adjusting, responsive to detecting the at least one mode hop and based on at least one parameter corresponding to the at least one mode hop, at least one operating parameter selected from:
  - a first laser current parameter selected to reduce mode hops;
  - a second laser current parameter selected to compensate for changing write widths based on a size of the at least one mode hop;
  - an adjacent track interference weighting parameter based on the size of the at least one mode hop; and
  - a risk parameter correlating the size of the at least one mode hop to degradation of the head; and
- writing, to the non-volatile storage medium, user data using the adjusted at least one operating parameter.

18. The method of claim 12, further comprising:
- configuring an acquisition window of the harmonic sensor corresponding to a sector portion of the at least one track;
- determining a range of laser current values used during writing the tone pattern in the sector portion;
- configuring a set of acquisition frequencies of the harmonic sensor corresponding to positions of changes in laser current value across the range of laser current values; and
- determining, using the plurality of phase error values to calculate phase shift relative to the changes in laser power, a corresponding set of down track thermal gradient values, wherein the operating condition comprises the set of down track thermal gradient values correlating changes in laser power to changes in width and position of written data.

19. The method of claim 18, further comprising:
- determining a baseline set of down track thermal gradient values;
- comparing, during field operation of the data storage device, the corresponding set of down track thermal gradient values to the baseline set of down track thermal gradient values to generate at least one thermal gradient change value;
- adjusting, responsive to the at least one thermal gradient change value meeting a change threshold, at least one operating parameter selected from:
  - a laser current parameter selected to adjust down track thermal gradient based on the at least one thermal gradient change value;
  - an adjacent track interference weighting parameter based on a correlation between down track thermal gradient values and a write width parameter;
  - a risk parameter correlating the at least one thermal gradient change to degradation of the head;
  - a smear removal threshold for initiating a smear removal operation based on low down track thermal gradient values; and a thermal fly height control parameter to adjust head-media spacing based on the at least one thermal gradient change; and writing, to the non-volatile storage medium, user data using the adjusted at least one operating parameter.

20. A data storage device comprising:

a non-volatile storage medium comprising a plurality of data tracks;

a head actuated over the non-volatile storage medium, wherein the head comprises a laser configured to heat the non-volatile storage medium while writing data to the non-volatile storage medium;

means for writing, using the head, a tone pattern to at least one track on the non-volatile storage medium;

means for acquiring, using a harmonic sensor in a read channel configured to receive a read signal from the head, amplitude data from the tone pattern and corresponding to differences between a target frequency of the tone pattern and a read frequency from the read signal;

means for determining, based on the amplitude data, a plurality of phase error values; and means for determining, based on the plurality of phase error values, an operating condition of the laser during the writing.

* * * * *